(12) United States Patent
Sahebkarkhorasani et al.

(10) Patent No.: US 12,395,368 B2
(45) Date of Patent: Aug. 19, 2025

(54) CONTROLLED ENVIRONMENT COMPUTER SYSTEMS AND METHODS FOR SECURE GROUP SERVICES WITH MOBILE COMPUTER DEVICES

(71) Applicant: HomeWAV, LLC, St. Louis, MO (US)

(72) Inventors: Seyedmorteza Sahebkarkhorasani, St. Louis, MO (US); Andrew Joseph Lewis, Ballwin, MO (US)

(73) Assignee: HomeWAV, LLC, St. Louis, MO (US)

( * ) Notice: Subject to any disclaimer, the term of this patent is extended or adjusted under 35 U.S.C. 154(b) by 0 days.

(21) Appl. No.: 18/453,724

(22) Filed: Aug. 22, 2023

(65) Prior Publication Data

US 2025/0070992 A1 Feb. 27, 2025

(51) Int. Cl.
*H04L 12/18* (2006.01)

(52) U.S. Cl.
CPC ...... *H04L 12/1818* (2013.01); *H04L 12/1822* (2013.01); *H04L 12/1831* (2013.01)

(58) Field of Classification Search
CPC ............. H04L 12/1818; H04L 12/1822; H04L 12/1831
See application file for complete search history.

(56) References Cited

U.S. PATENT DOCUMENTS

| | | | | |
|---|---|---|---|---|
| 7,529,357 B1 * | 5/2009 | Rae | ..................... | H04M 3/38 379/189 |
| 8,648,894 B2 * | 2/2014 | Laney | ................... | G06Q 10/10 379/202.01 |
| 9,007,420 B1 * | 4/2015 | Passe | ................ | H04M 3/42102 379/142.05 |
| 9,094,569 B1 * | 7/2015 | Humphries | ............ | G06Q 20/14 |
| 9,106,789 B1 * | 8/2015 | Shipman, Jr. | ............ | H04N 7/15 |
| 9,124,763 B2 | 9/2015 | Humphries | | |
| 9,288,439 B2 * | 3/2016 | Bloms | ................ | H04L 65/4038 |
| 9,443,070 B2 * | 9/2016 | Torgersrud | ............. | H04L 63/30 |
| 9,558,523 B1 * | 1/2017 | Hodge | ................... | G06V 40/50 |
| 9,609,269 B2 * | 3/2017 | Humphries | ............ | H04N 7/148 |
| 9,723,040 B1 * | 8/2017 | Lubbehusen | ....... | H04L 65/1069 |
| 9,769,310 B2 * | 9/2017 | Hodge | .................. | H04M 17/01 |
| 9,800,830 B2 | 10/2017 | Humphries | | |
| 9,826,003 B1 * | 11/2017 | Thomasson | ............. | H04M 3/38 |
| 9,924,135 B1 * | 3/2018 | Smith | .................... | G06Q 10/10 |
| 9,973,810 B2 * | 5/2018 | Hodge | ............... | H04L 65/1059 |
| 10,057,256 B1 * | 8/2018 | Talbot | ................. | H04L 63/0853 |
| 10,225,396 B2 * | 3/2019 | Hodge | .................. | H04L 67/535 |
| 10,296,784 B2 * | 5/2019 | Passe | ................ | H04M 3/42059 |
| 10,296,994 B2 * | 5/2019 | Hodge | ................... | G06Q 50/26 |
| 10,313,632 B2 | 6/2019 | Humphries | | |

(Continued)

*Primary Examiner* — G. C. Neurauter, Jr.
(74) *Attorney, Agent, or Firm* — Armstrong Teasdale LLP

(57) ABSTRACT

Systems and methods for managing interactions between a population of incarcerated inmates in a correctional facility and non-incarcerated visitors include a plurality of inmate and visitor computer devices, and an audio/visitor services computer device. The system is securely configured to interface selected ones of the inmate computer devices and selected ones of the plurality of visitor computer devices to provide at least one group service for a spontaneous group interaction between a single uniquely identified one of the incarcerated inmates and a plurality of pre-approved visitors for the single uniquely identified one of the incarcerated inmates.

51 Claims, 18 Drawing Sheets

(56) References Cited

U.S. PATENT DOCUMENTS

| | | | | |
|---|---|---|---|---|
| 10,333,870 | B2 * | 6/2019 | Hodge | H04L 51/043 |
| 10,404,853 | B2 * | 9/2019 | Smith | H04M 3/2281 |
| 10,929,941 | B1 * | 2/2021 | Suleman | H04L 12/1818 |
| 10,944,803 | B1 * | 3/2021 | Johnston, Jr. | H04L 51/046 |
| 2007/0285504 | A1 * | 12/2007 | Hesse | H04N 7/15 |
| | | | | 348/E7.083 |
| 2008/0000966 | A1 * | 1/2008 | Keiser | G06Q 10/10 |
| | | | | 235/382 |
| 2008/0201158 | A1 * | 8/2008 | Johnson | G10L 15/26 |
| | | | | 705/1.1 |
| 2011/0096139 | A1 * | 4/2011 | Rudolf | H04N 7/147 |
| | | | | 348/E7.078 |
| 2012/0262271 | A1 * | 10/2012 | Torgersrud | G06F 21/32 |
| | | | | 382/118 |
| 2013/0194377 | A1 * | 8/2013 | Humphries | H04M 7/00 |
| | | | | 348/14.08 |
| 2013/0263227 | A1 * | 10/2013 | Gongaware | G06F 21/32 |
| | | | | 726/4 |
| 2020/0275056 | A1 * | 8/2020 | Smith | H04L 65/1101 |
| 2021/0287197 | A1 * | 9/2021 | Best | G07F 17/0042 |

* cited by examiner

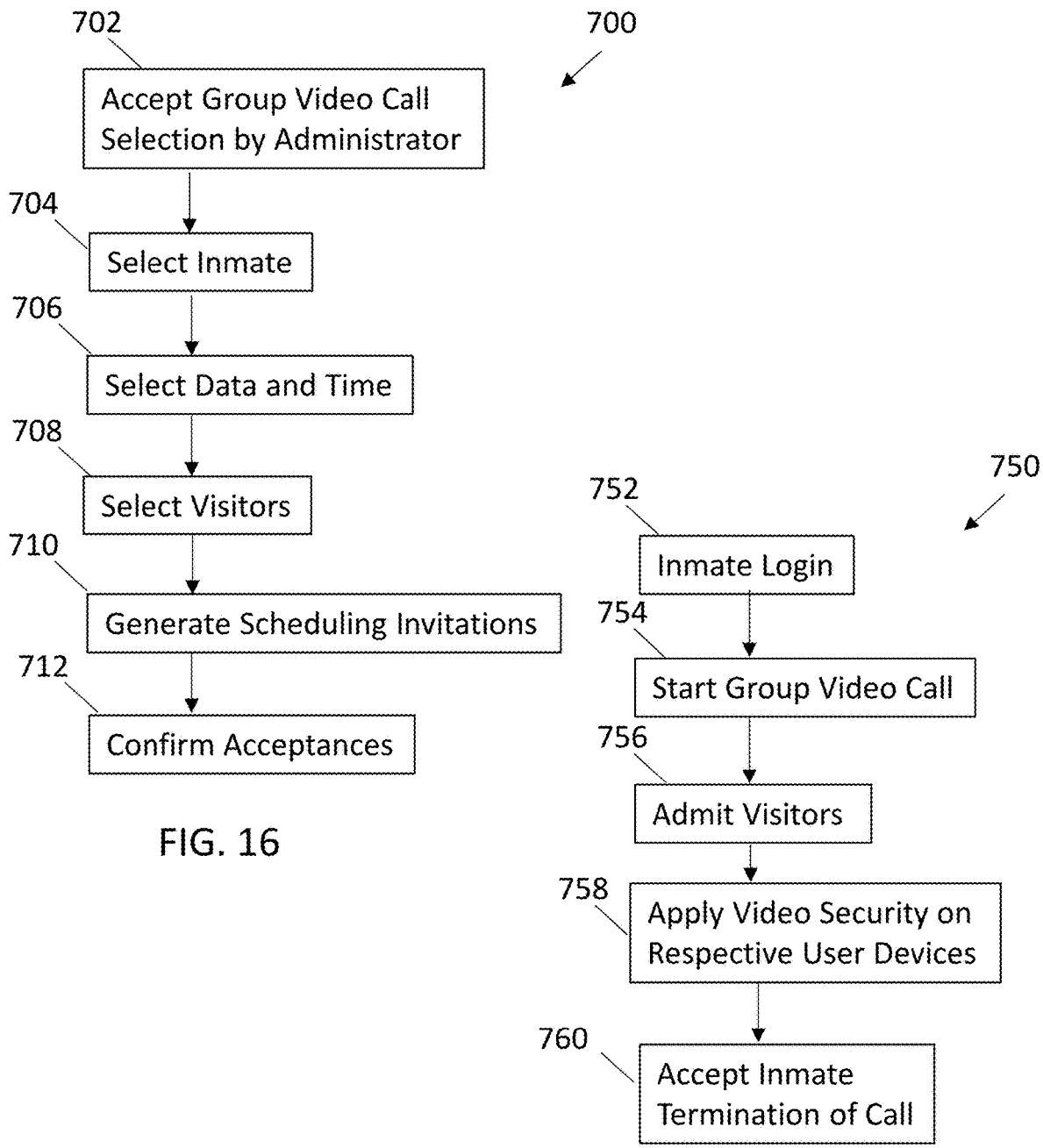

CONTROLLED ENVIRONMENT COMPUTER SYSTEMS AND METHODS FOR SECURE GROUP SERVICES WITH MOBILE COMPUTER DEVICES

CROSS REFERENCE TO RELATED APPLICATIONS

The present application relates in part to subject matter described in U.S. application Ser. No. 17/576,319 filed Jan. 14, 2022 and now issued U.S. Pat. No. 11,856,325, the disclosure of which is hereby incorporated by reference in its entirety.

BACKGROUND OF THE INVENTION

The field of the invention relates generally to computer-implemented systems and methods configured to manage electronic audio/video exchanges between persons in a controlled environment and persons outside of the controlled environment using respective computer devices, and more specifically to computer-implemented correctional facility systems and methods with enhanced security safeguards and controls needed to securely implement non-singular interactions between incarcerated inmates and non-incarcerated visitors via mobile computing devices such as tablet computer devices.

Computer-implemented correctional facility systems exist to foster mutually beneficial relationships between incarcerated inmates and friends and family while reducing burdens on correctional facility staff and personnel to logistically coordinate and oversee interactions between inmates and friends and family. Present day systems are overly restrictive and undesirable in certain aspects from inmate and visitor perspectives that can negatively impact the user experience. On the other hand, continued evolution of computer-implemented technology in the correctional facility setting is undesirable in other aspects from the correctional facility perspective, such that some correctional facilities are reluctant to employ certain features that would otherwise be beneficial due to security concerns.

Improved correctional facility systems are accordingly desired to more fully meet the needs of the marketplace and balance the competing interests of inmate and visitor users versus security interests of correctional facilities.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

FIG. 16 is a flow chart of exemplary algorithmic processes for group video call scheduling in the systems shown in FIGS. 1 and 2 and in the mode illustrated in FIG. 4.

FIG. 17 is a flow chart of exemplary algorithmic processes for completing a scheduled group video call with the systems shown in FIGS. 1 and 2 and in the mode illustrated in FIG. 4.

DETAILED DESCRIPTION OF THE INVENTION

Figure 1:
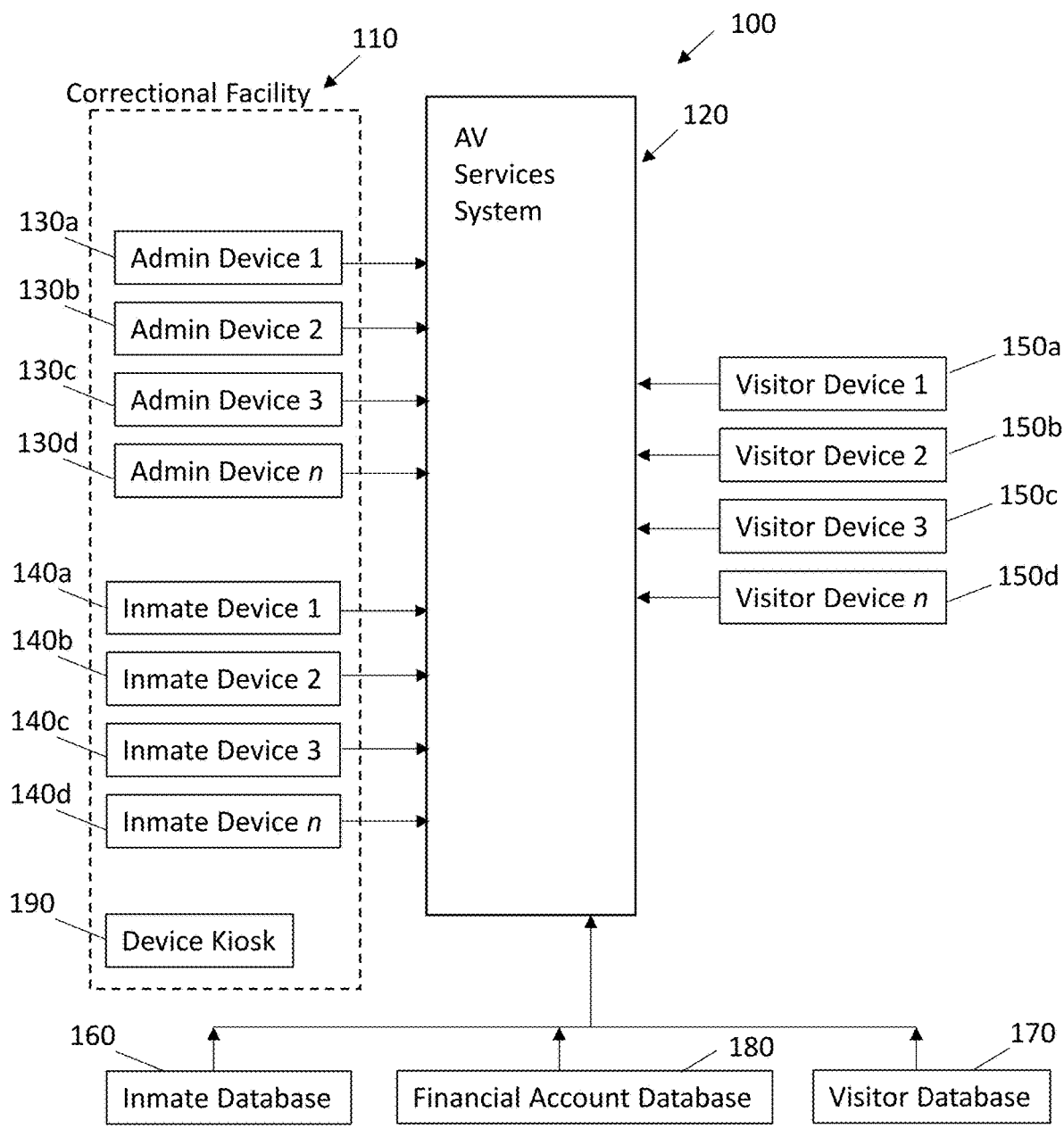
FIG. 1 is a is a block diagram of an exemplary computer-implemented correctional facility audio/video communication services system offering group interactions between inmates and remotely located visitors.

The inventive concepts described herein beneficially address particular issues presented by an adoption of computer systems accessible by inmates in correctional facilities via portable electronic devices such as tablet computer devices to communicate with remotely located non-incarcerated visitors also via portable electronic devices. Accordingly, in order to understand the invention to its greatest extent the following discussion of the state of the art and particular challenges presented in view of unique, long-standing security needs of a controlled environment in a correctional facility is presented below, followed by exemplary embodiments of the inventive computer implemented systems and methods that advantageously overcome disadvantages and limitations in the state of the art.

For security reasons, interactions between incarcerated inmates and friends or family members have been historically limited in a singular way. That is, at any given point in time, one and only one visitor (e.g., a family member or a friend) has been allowed to personally interact with an incarcerated inmate in a correctional facility. While computer-implemented correctional facility systems are now in use that vastly simplify the logistical issues of incarcerated inmate interactions with approved visitors at locations outside of the correctional facility via voice and/or video conference calls, the same singular visitation limitation has been understandably carried over to such computer-implemented systems. As such, and for example, relatively sophisticated technology has been in use for decades in the correctional facility industry to enforce the singularity rule in relation to telephone calls so that only two parties, namely one identified inmate and one identified visitor may be on a telephone call. Specifically, automated technology has been developed to actively monitor such a telephone call in progress, automatically detect a presence of a third party on the line, and terminate a telephone call if a third party presence is detected.

Various types of customized computer systems also exist to meet the unique needs of correctional facilities in aspects other than telephone calls. Such customized computer systems aim to ease administrative burdens to correctional facility personnel who oversee the facilities, and allow inmates to conveniently but securely exercise privileges made available to them in correctional facilities. For example, HomeWAV, LLC (www.homemax.com) has developed a custom video visitation system that is specifically configured to allow spontaneous electronic audio/video visitation sessions between online pre-registered inmates in a correctional facility and pre-registered remotely located visitors via respective computer devices accessible to inmates and computer devices of approved, registered visitors which are interfaced to the inmate computer devices through hosted services of the HomeWAV® video visitation system. To date, a portfolio of patents (see, e.g., U.S. Pat. Nos. 10,313,632; 9,800,830; 9,124,763; and 9,094,569 among others) have been awarded to inventive aspects of the HomeWAV® video visitation system.

The patented HomeWAV® video visitation system is implemented in wall-mounted computer kiosks and/or mobile computer devices such as tablet computer devices that are made available for use by inmates in a correctional facility, with the wall-mounted kiosks or tablet computer devices being configured to communicate exclusively with the patented HomeWAV® video visitation system in a secure manner. Visitors may use computer kiosk devices located in a correctional facility which are interfaced through the patented HomeWAV® video visitation system to an inmate device, or may use a computer device of their own choosing, including but not limited to smartphones and tablet computers, at a remote location from the correctional facility to conduct off-site visitation sessions with inmate(s) via the patented HomeWAV® system. Video visitation sessions may be conveniently conducted with desired inmates in the same or different correctional facility via the respective devices used by the inmates inside the respective correctional facilities and the visitor device(s) of registered visitors.

The patented HomeWAV® video visitation system dramatically reduces, if not eliminates, burdens on correctional facility personnel in aspects of otherwise conventionally required logistical scheduling, manual approval of visitation requests and/or beginning or ending a visitation session, while nonetheless providing adequate security safeguards and oversight capabilities needed by correctional facility personnel. Numerous benefits of frequent visitation sessions with incarcerated inmates are beneficially realized via the patented HomeWAV® system at relatively low cost, and sometimes at no cost, to correctional facilities. Further, video visitation services are only one of many services made available to inmates via the patented HomeWAV® system to authorized inmates having current privilege status allowing them to access the system.

With respect to mobile computer devices that may be harnessed in the operation of the patented HomeWAV® system to conduct online visitation sessions and other featured services made available to inmate in a correctional facility, the modern day proliferation of mobile computer technology and handheld computing devices in society has conventionally been avoided in correctional facility computer systems for a variety of reasons, some of which are now receding rapidly. Specifically, an availability of relatively powerful tablet computer devices now available at relatively low cost, coupled with the convenience that they provide, makes them an attractive option to conventional, non-mobile computer terminal devices now in use at correctional facilities for visitation purposes via voice calls and video conference calls, as well as other desirable applications that inmates may access when permitted by facility administrators.

While the patented HomeWAV® video visitation system has been well-received in the marketplace, its use is, like other correction facility systems, restricted by design in view of applicable security concerns for correctional facility use. For example, the patented HomeWAV® video visitation system allows in inmate to initiate an voice or video conference call with a single (i.e., only one) visitor, or to record a video message to send to a single (i.e., only one) visitor. Group interactions via voice or video conference call including an identified inmate and more than one approved visitor is not possible in the HomeWAV® system, and neither is any ability for an ability for an inmate to send one and the same video message to a group of visitors at once. Simpler and less data intensive group messaging, such as direct messaging including images, emojis and the like that are commonplace outside the correctionally facility setting are likewise generally prohibited in correctional facility systems and are therefore not available either in the HomeWAV® video visitation system. For a variety of reasons, group interaction in all of the forms above would be desirable by inmate users and corresponding groups of visitor users but are customarily not permitted across the correctional facility industry. Because of such industry prohibitions, correctional facility system providers have not introduced such group services.

Given the widespread use of video conferencing solutions outside of the correctional facility world that non-incarcerated friends and family are now well-accustomed to, the singular visitation limitations of existing correctional facility systems may be considered unduly restrictive by friends and family, as well as to inmates, who would collectively benefit substantially from group interaction with an inmate via respective electronic devices inside and outside of the correctional facility. The appeal and impact of group video conferencing platforms such as Microsoft Teams or Zoom is enticing enough that such platforms are occasionally accessed in correctional facilities, despite the security risks that they may present, because existing correctional facility systems do not permit group interaction. From the correctional facility perspective, however, the longstanding prohibitions on group interactions between inmates and visitors, and the significant security concerns behind those prohibitions, are a daunting obstacle for correctional facility system providers to overcome. Such security concerns, at present, are unresolved by existing correctional facility system technology, and from the perspective of some correctional facility administrators, online visitation sessions via mobile computing devices remains fraught with security concerns that to date are unresolved with existing technology.

In view of the above, some correctional facilities are presently, and understandably, very uncomfortable with the idea of video conferencing between inmates and non-incarcerated visitors with mobile computer devices as a general proposition. In view of the same, some correctional facilities are reluctant to accept the perceived risks of existing correctional facility systems that employ mobile computing devices with standard, singular communications between one inmate and one visitor. For such facilities, expanding the use of correctional facility systems to include group interaction capability between inmates and visitors is a nonstarter.

Correctional facility concerns for mobile computer devices that are now available to conduct video visitation sessions and other communications between inmates and visitors mirror those behind existing prohibitions for group interactions between inmates and visitors. Unlike non-mobile computer terminal devices in which a camera can be mounted in a fixed position with a fixed field of view in use that a correctional facility may effectively control, the mobile nature of handheld tablet computer devices means that the potential fields of view in the use of mobile inmate devices and mobile visitor devices cannot as a practical matter be secured or controlled.

Specifically, inmate and visitor use of a mobile computing device such as a tablet computer or a smartphone wherein the user may position and re-position the device, as well as move about with the device and in turn change the field of view of the camera, raises a host of undesirable possibilities which individually and collectively would be very difficult for correctional facility personnel to detect or interrupt in real time using existing technology across singular and non-singular groups interactions. Such undesirable happenings and associated security issues include, but are not necessarily limited to, the following:

(i) possible interaction between an inmate and respectively unauthorized third person visitors in the camera's field of view in a mobile device utilized by a visitor;

(ii) possible unauthorized interaction between a visitor and more than one inmate in the camera's field of view in a mobile device utilized by an inmate;

(iii) possible presence in the camera's field of view in a mobile device utilized by an inmate or a visitor of one or more un-consenting third parties, including but not necessarily limited to another inmate, correctional facility personnel, an adult bystander, or a minor or a young child without parental consent, all of which could be potentially maliciously exploited;

(iv) intentional or inadvertent live video broadcast of a nude person or nude persons from any of the mobile devices utilized by an inmate or visitor;

(v) a video broadcast including inappropriate content (e.g., pornography, drug paraphernalia) in the camera's field of view of one or more mobile devices;

(vi) display of background objects in video feeds that may facilitate subterfuge communication between inmates and visitors;

(vii) broadcast of sensitive details of public and private locations, including personal residences, that preferably should not be seen or observed by inmates;

(viii) broadcast of correctional facility layout and security details that ought not to be public information; and (ix) capability of inmates and visitors to suddenly and unpredictably move from acceptable to non-acceptable locations presenting one or more of the above issues.

For the purposes herein, the above examples are individually and in combination are referred to as "unsecure" content in the aspects of video transmission being conducted with a mobile device. Such aspects are "unsecure" in the sense of including (or facilitating) content or activity that would otherwise be prohibited and easily managed if it arose in person at the correctional facility but that is difficult to detect or control by the correctional facility in the use of portable computer devices in the correctional facility, let alone for remotely located mobile computer devices operated by visitors.

For proposed group video visitations between an inmate and multiple visitors, the above concerns would be multiplied on a per-user basis across the number of visitors that inmates may participate interactively in electronic audio/video exchanges with mobile computing devices. Improvements are accordingly desired to improve the operation of mobile computer devices to more securely manage electronic audio/video exchanges and overcome unresolved security needs by correctional facilities. Barriers in some correctional facilities to embrace otherwise substantial benefits of mobile computing devices in correctional facility systems are therefore overcome.

Exemplary embodiments of secure correctional facility computer systems and methods are described below that overcome the problems discussed above with respect to managing electronic audio/video exchanges via enhanced security features to more securely accommodate electronic audio/video exchanges in a manner that extends to singular and non-singular (i.e., group) video visitation services, singular and non-singular voice visitation services, and group messaging services. Appropriate automated security, controls and safeguards operating upon and through mobile user devices capably meet the security needs of correctional facilities and overcome the longstanding resistance to group services in the industry due to intractable security concerns that customarily have existed. Singular and non-singular audio/video exchange services are bundled in a secure system with a trackable location, avoiding any need to use separate platforms such as Microsoft Teams and Zoom with their associated security risks to remotely establish group conferences.

Exemplary automated security, controls and safeguards implemented in the inventive computer systems and computer-implemented methods may advantageously include technical features such as: (i) unique identification of inmates authorized to access the system through a connected inmate computer device that may be mobile: (ii) exclusive access to authorized inmates, via the inmate computer device, of options to start or terminate spontaneous electronic audio/video data exchanges for an authorized group of visitor users via respective connected visitor computer devices: (iii) group member selection and group size restrictions to ensure that only a manageable number of pre-approved visitors for each uniquely identified inmate may participate in an authorized group for audio/video services: (iv) live and on-demand monitoring of group audio/video services by correctional facility personnel via a connected administrator computer device: (v) selective facility-wide enabling or disabling of group audio/video services to meet the respective needs or different correctional facilities: (vi) automatic image processing of video feeds generated by user devices to prevent a video transmission of unsecure video content during a singular or group electronic audio/video exchange: (vii) selective operation of automatic image processing in one of a plurality of image processing modes with respectively different degrees of security for singular and group electronic audio/video exchanges; and (viii) exclusive access by correctional facility staff to security settings and options for image processing to flexibly meet the needs of respectively different facilities. Further technical features are described below that are operative in combination to enhance a secure operation of the system and overcome the challenges presented in desirable use of mobile computer devices in correctional facility applications. Inmates and visitors may enjoy desirable group interactions via secure electronic audio/video exchanges with assurance to correctional facilities that desired security needs in group audio/video interactions can be effectively managed.

While described in the context of correctional facilities such as jails and prisons, and also while described specifically in the context of the patented HomeWAV® video visitation services, the inventive concepts described herein are not necessarily limited to correctional facilities such as jails or prisons, and further are not necessarily limited to video visitation system services. Rather, the inventive concepts described herein may more generally accrue to a broad variety of other institutional facilities, including but not limited to certain types of inpatient medical, psychiatric, or rehabilitation facilities that present similar issues concerning controlled access restrictions and security oversight in the use of computer devices made available to a confined user population in the facility for unique security reasons applying to the facility that generally do not exist in non-confined user populations in non-institutional settings. Method aspects will be in part explicit and in part apparent in the description below.

FIG. 1 is a is a block diagram of a computer-implemented correctional facility services system 100 offering secure group interactions between resident users in a controlled environment such as a correctional facility 110 housing incarcerated inmates and remotely located non-incarcerated visitors. As non-limiting examples, such correctional facilities may include state prisons, federal prisons, local jails, juvenile correctional facilities, Native American detention facilities, and military detention facilities. The controlled environment of such facilities includes strict security measures, oversight, monitoring, and controls to securely manage populations of inmates for the safety of the inmates, correctional facility officers and staff attending to the inmates, and also for visitors. The controlled environment of the correctional facility also includes access controls and restrictions applicable to the use of computer devices made available in the correctional facility 110.

As shown in FIG. 1, the system 100 includes an audio/video ("AV") communication services system 120 that is in communication with computer devices 130 and 140 in the correctional facility 110 for respective use by correctional facility administrators and incarcerated inmates. In the example of FIG. 1, administrator computer devices 130a, 130b, 130c and 130d are shown, although the system 100 is scalable to include any number n of administrator computer devices 130. Likewise in the example of FIG. 1, inmate computer devices 140a, 140b, 140c and 140d are shown, although the system 100 is scalable to include any number n of inmate computer devices 130. In the typical case, the number of correctional facility administrators in a given facility is far fewer than the number of inmates. Numerous correctional facilities exist today having populations of more than a thousand inmates, and some correctional facilities exist today having populations of more than ten thousand inmates. Ideally, and as rule of thumb, the ratio of inmate computer devices 140 to inmates should be about 1:5 to ensure that a sufficient number of inmate computer devices are available to inmates when needed, although this is by no means required in all cases and such ratio of inmates to inmate computer devices may vary considerably amongst different correctional facilities 110.

The AV communication services system 120 is further in communication with computer devices 150 for respective use by non-incarcerated friends and family of incarcerated inmates (collectively referred to herein as "visitors") at respective locations remote from the correctional facility 110 where an inmate is housed. In the example of FIG. 1, visitor computer devices 150a, 150b, 150c and 150d are shown, although the system 100 is scalable to include any number n of visitor computer devices 130. The AV communication services system 120 beneficially interconnects respective ones of the inmate devices 140 and visitor devices 150 to conduct live electronic audio/video exchanges and other features described herein while applying correctional facility administrator preferences and monitoring capability via the administrator devices 130.

In the system 100, and by virtue of the AV communication services system 120, inmate users may spontaneously initiate (i.e., without prior scheduling and without required action by correctional facility personnel at the time of initiation by the inmate) to use the services of the AV services system to conduct, for example, a video call. The video call may likewise proceed, from beginning to end, without requiring any action of correctional facility personnel. The video call is conducted via one of the inmate devices 140 that is interfaced through the AV services system 120 with selected visitor devices 150 of respective visitors that are approved in advance. As such, the number of approved visitors and therefore visitor devices 150 will typically exceed the number of inmates in a given inmate population for a particular correctional facility 110. The AV communication services system 120 may simultaneously operate to provide services for inmate devices 140, according to preferences and controls realized by the administrator devices 130 of multiple correctional facilities 110, to realize electronic audio/video exchanges with visitors via visitor devices 150. The electronic audio/video exchanges and services established through the system 100 may include, among other services described below, group video calls for group visitation sessions or group video calls for other purposes such as court proceedings as described below.

With respect to each correctional facility 110, the AV communication services system 120 is operative in reference to an inmate database 160 which includes correctional facility data and information, authorized inmate information and data, inmate privilege information and data. The AV communication services system 120 is further operative in reference to a database 170 including non-inmate user data such as pre-authorized remote visitor data, and a database 180 including financial account data for the services made available through the AV services system 120. The databases 160, 170, 180 may in some cases be combined and/or additional databases may be included to contain some of the same data and information as well as other data and information needed to perform the system functionality described herein.

In contemplated embodiments the AV communication services system 120 may be a web-based, hosted services system in which the respective administrator, inmate and visitor uses may login via web portals with stationary computer terminal devices and/or via specific interface apps running on mobile computer devices. The computer devices 130, 140, 150 may therefore be a combination of stationary computer devices and mobile computer devices, although the enhancements of the inventive system 100 are aimed toward issues posed by mobile computer devices and as such in a contemplated embodiment of the system 100 the number of mobile computer devices used in the system 100 would vastly exceed the number of stationary computer terminals. The system 100 is particularly convenient for remotely located visitors and visitor devices 150 by eliminating any need to travel to the correctional facility 110, but it is recognized that in some cases a visitor may travel to a correctional facility and conduct a video visitation system with an inmate while there via a stationary computer terminal or a mobile device made accessible to the visitor in the facility.

The system 100 may be configured in a similar manner to the patented HomeWAV® system, and the reader is referred to U.S. application Ser. No. 17/576,319 which is incorporated by reference above for more specific detail regarding system architecture and server-based video conferencing and video messaging functionality that may be included in the system 100 but enhanced as described further below to meet the additional security needs presented by mobile computer devices that may be utilized by inmates and visitors.

It is recognized, however, that a web-based, hosted AV communication services system 120 system is only one of a number of ways that the system 100 could be implemented while otherwise meeting the security requirements of correctional facilities with respect to adoption of mobile computer devices. In particular, networked, server-based systems may be provided that do not necessarily require web access to operate, and the AV communication services system 120 could in some cases be located in a correctional facility, as opposed to being remotely located. Numerous system architectures, distributed or undistributed, may be employed in the AV communication services system 120 in various embodiments with otherwise similar functionality from the inmate and visitor user perspective. In certain embodiments for smaller inmate populations, the AV communication services system 120 need not be a server-based system at all, and could instead be run on single computer devices or combinations of computer devices that do not include computer servers.

In certain contemplated embodiment, the AV communication services system 120 may further operate in combination with a configurable computer kiosk system 190 that provides both stationary computer terminal capability and secure check-out and check-in of an optimal number of mobile computer devices for use by inmates in a correctional facility, as well as intelligent charging of mobile computing devices, coordinated content management for the mobile computer devices, and intelligent security monitoring and controls of devices being used by inmates at any given point in time. An exemplary kiosk of this type is described in detail in U.S. patent application Ser. No. 17/201,918 filed Mar. 15, 2021 that is commonly owned by HomeWAV, LLC and for which the entire contents are hereby incorporated by reference as being applicable for use in the system 100. It should be recognized, however, that other types of kiosk systems are possible to manage a secure use of mobile computer devices in a correctional facility, and also that successful management of mobile computing devices does not necessarily require a kiosk in all cases where the system 100 would otherwise be beneficial. The kiosk system 190 may therefore be considered optional and need not be included in certain implementations of the system 100.

Figure 2:
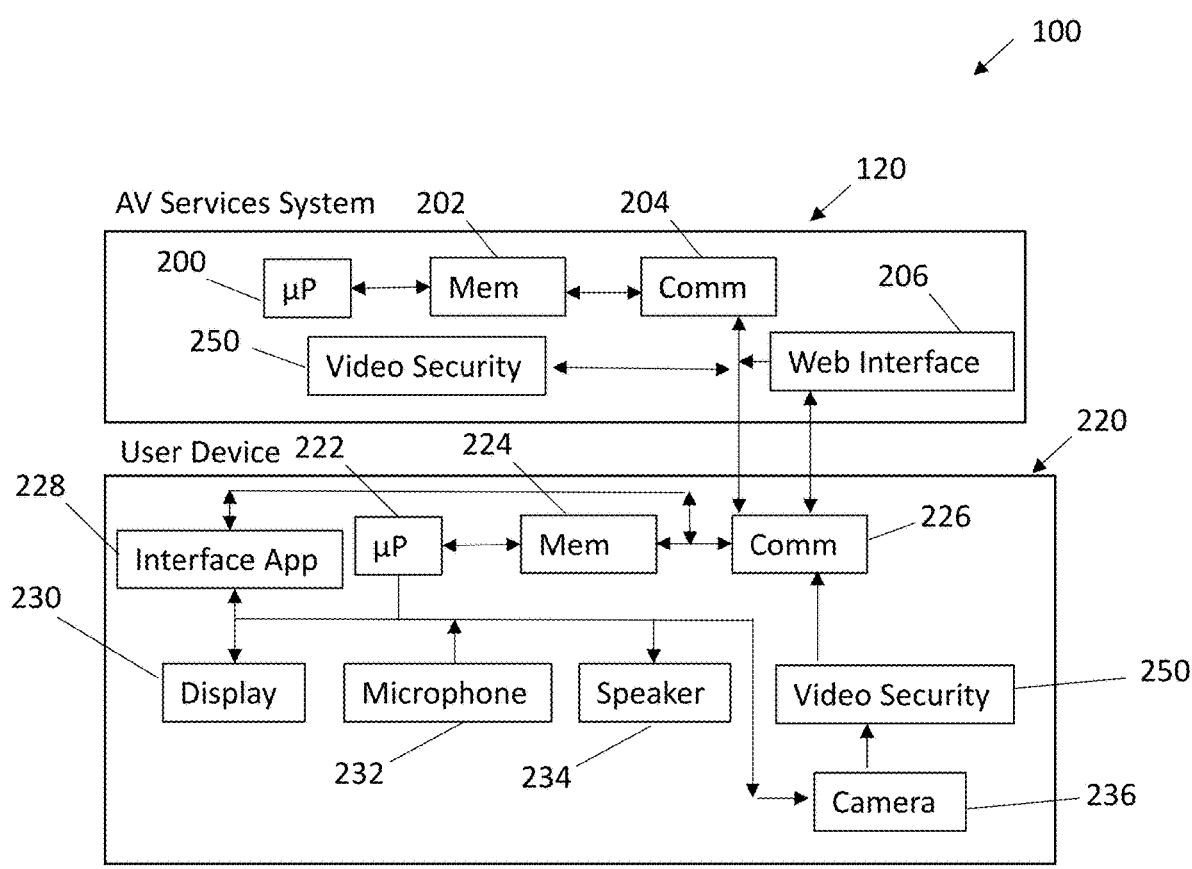
FIG. 2 is a block diagram of a portion of the system shown in FIG. 1.

FIG. 2 is a block diagram of a portion of the system 100 shown in FIG. 1 wherein the AV communication services system 120 is shown to include a central processor unit (CPU) including one or more processors or microprocessors 200, a memory 202, a communication element 204 and a web interface 206. The AV communication services system 120 is in communication with a user device 220 that may be utilized a computer device 130, 140 or 150 in the operation of the system 100.

The user device 220 includes a CPU including one or more processors or microprocessors 222, a memory 224, and a communication element 226. The communication element 226 is a known element communicating with the web interface 206 of the AV system 120 in a known manner using a wired or wireless communication path to establish an Internet connection between the devices using known communication protocols and techniques. When the user device 220 is configured as a mobile computer device, it may also include a user interface app 228 that establishes communication with the AV service system 120 as shown.

When the user device 220 is configured as an administrator device, it runs an administrator interface application 228 presenting graphical screen displays to an administrative user in order to present options and accept selection inputs to enable and disable selected features or selected services in the operation of the AV system 120, to optimize system settings in view of the needs and preferences of the particular correctional facility 110 (FIG. 1) in which AV services are being offered through devices 220 of inmates and visitors, and to monitor and oversee services in use. The graphical screen displays are presented in interactive form that is responsive to administrator selections using navigational home pages and sub-pages each including organized buttons, menus and sub-menus, drop-down selection fields, fill-in data entry fields, pop-up dialog boxes, check boxes and other known features familiar to app developers and users.

When the user device 220 is configured as an inmate device, it runs an inmate interface application 228 presenting graphical screen displays to an inmate user in order to securely login and identify authorized inmates to use services offered through the AV system 120, present options to inmates and accept selection inputs for available services and to present output screen displays and functionality for selected services. The graphical screen displays are presented in interactive form that is responsive to inmate selections using navigational home pages and sub-pages each including organized buttons, menus and sub-menus, drop-down selection fields, fill-in data entry fields, pop-up dialog boxes, check boxes and other known features familiar to app developers and users.

When the user device 220 is configured as a visitor device, it runs a visitor interface application 228 presenting graphical screen displays to a visitor user in order to present options and accept selection inputs for available choices and to present output screen displays and functionality for selected services. The graphical screen displays are presented in interactive form that is responsive to visitor selections using navigational home pages and sub-pages each including organized buttons, menus and sub-menus, drop-down selection fields, fill-in data entry fields, pop-up dialog boxes, check boxes and other known features familiar to app developers and users.

Examples of screen displays generated by administrator, user and visitor interface applications 228 are set forth in U.S. application Ser. No. 17/576,319 which is incorporated by reference above and which may be included in the operation of the system 100. Further examples of screen displays generated by administrator, user and visitor interface applications 228 are also set forth below for certain aspects of operation of the inventive system 100. The interface applications 228 may be designed to run in an iOS or Android operating system of the device 220 which may be configured as a handheld tablet computer device or smartphone device, while still communicating seamlessly with the AV services system 120 running on still another known operating system.

The user device 220 may as shown also include a display 230 that is configured to be a touch sensitive display that is fully operative as a known input/output device, a microphone 232, a speaker 234 and at least one camera 236. The display 220, speaker 234 and camera 236 may be provided as built-in elements of the computer device 220 when configured as mobile device such as a tablet computer, a smartphone or a notebook or laptop computer. The computer device 202 may alternatively be provided at least in part as separate components usable together in a desktop, workstation or computer terminal set up. Additional input/output components such as a mouse, stylus and keyboard may be provided when desired. In the context of the present discussion, the speaker 234 includes a built-in speaker, a separately provided speaker, an audio jack providing an audio signal output from the device, and any connected headphone or headset arrangement and wireless ear bud components that a user may enjoy when using the device 220. External microphones may also be employed in connection with the device 200 via wired arrangements in known types of headphones, wired and wireless headsets, or wired and wireless handheld microphones that may be hand-held, tabletop devices, or secured in desired locations relative to computer monitors and the like in a correctional facility, home, or office environment.

The camera 236 may include a forward facing camera and a rear facing camera in some embodiments of user devices 222. In other embodiments, the user device 220 (such as an inmate device) may only include a forward facing camera. Video security components 250 are included in the user device 222, and may in some cases be implemented through the user interface application 228, to perform image processing on the video feeds generated by the camera 236 to provide enhanced video security features to address the issues discussed above with respect to security issues posed by the mobile nature of user devices 220 to conduct video visitation services in the correctional facility context. In further and/or alternative embodiments, video security components 250 may also be included in the AV services system 120 instead of or in addition to the user devices 220 which are operative on the video feeds of the camera 236 in each user device 250 wherein the enhanced security video processing options described further below are selectively enabled according to correctional facility preferences.

In each of the system 120 and the user device 220, the processors and memory storage operate in tandem to execute instructions, commands, and control algorithms, as well as other data and information required to satisfactorily operate the system 100 as described herein. The memory storage may be, for example, a random access memory (RAM), and other forms of memory used in conjunction with RAM memory, including but not limited to flash memory (FLASH), programmable read only memory (PROM), and electronically erasable programmable read only memory (EEPROM) may likewise be included.

Figure 3:
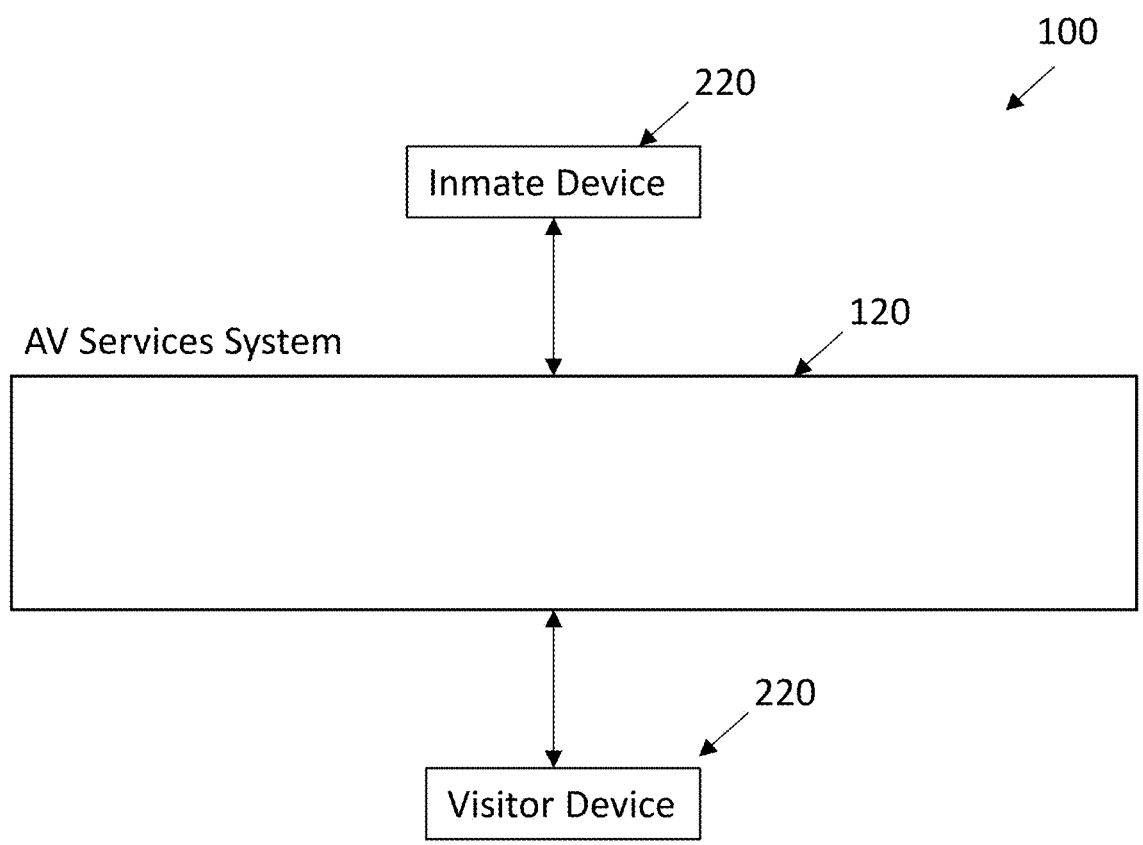
FIG. 3 illustrates an operation of the system shown in FIGS. 1 and 2 in a singular service mode.

FIG. 3 illustrates an operation of the system 100 in a singular service mode wherein one inmate device 220 and one visitor device 220 are operationally interconnected through the AV services system 120 to conduct a live electronic audio/video exchange for beneficial interaction between one inmate and one visitor in a visitation session or third party consultation (e.g., attorney/client consultation) where the visitor may participate from a remote location from the correctional facility where the inmate is incarcerated. The system 100 may likewise be utilized to record and send video messages from a single inmate to a single visitor or from a single visitor to a single inmate. Such singular, one-to-one operation between one inmate and one visitor is described in detail in U.S. application Ser. No. 17/576,319 which is incorporated by reference above and which may be included in the operation of the system 100. The enhanced video security features described below may be beneficially implemented in such singular service mode to address particular needs and overcome security related objections in certain correctional facilities to the use of mobile computer devices 220 to conduct video visitation sessions or to send and receive video messages.

Figure 4:
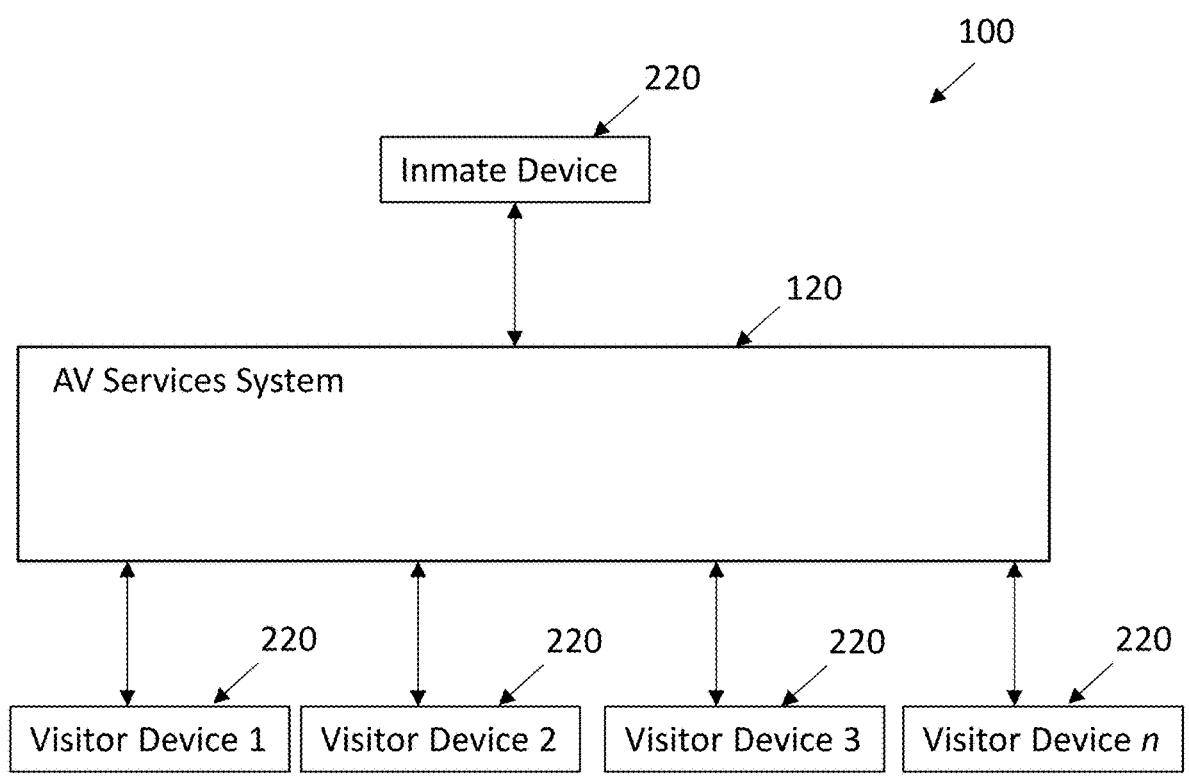
FIG. 4 illustrates an operation of the system shown in FIGS. 1 and 2 in a group service mode.

FIG. 4 illustrates an operation of the system 100 in a group service mode wherein one inmate device 200 and multiple visitor devices 220 are operationally interconnected through the AV services system 120 to conduct a live electronic audio/video exchange which may also be a visitation session or third party proceeding (e.g., a court proceeding) where the visitors may participate from a remote location from the correctional facility where the inmate is incarcerated. The system 100 may likewise be utilized to record and send video messages from a single inmate to the group of visitors via the visitor device 200 or from any of the visitors to the inmate and the remainder of the group of visitors via the respective devices 220. Such group service mode shown in FIG. 4 is specifically contrasted with the singular service mode shown in FIG. 3, and such group service mode is not described in U.S. application Ser. No. 17/576,319 which is incorporated by reference above. The enhanced video security features described below may be likewise beneficially implemented in the group service mode to address particular needs and overcome security related objections in certain correctional facilities to the use of mobile computer devices 220 to conduct video visitation sessions or to send and receive video messages.

Figure 5:
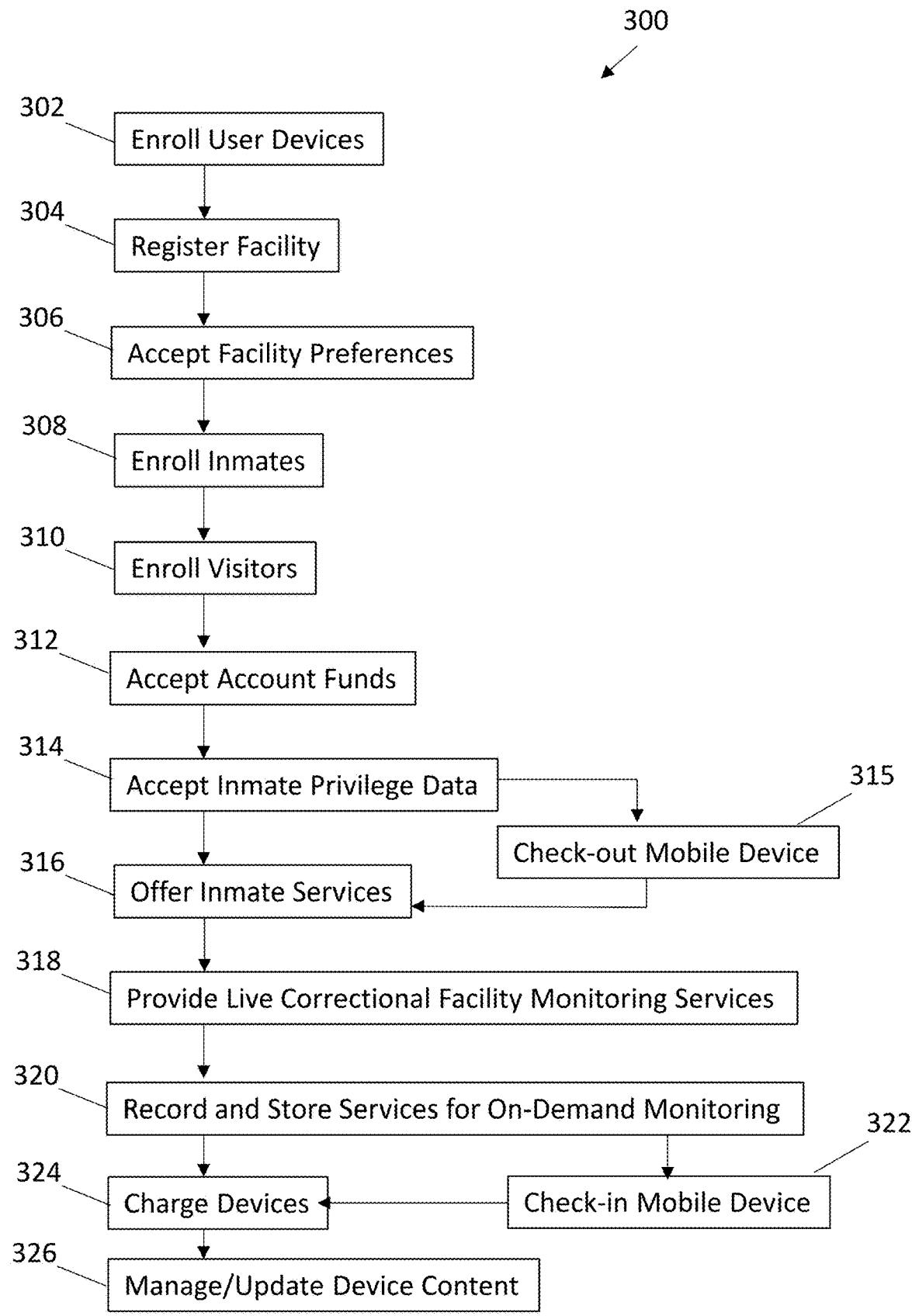
FIG. 5 is a flow chart of exemplary algorithmic processes performed by the systems shown in FIGS. 1 and 2.

FIG. 5 is a flow chart illustrating exemplary algorithmic aspects of processes 300 performed by the processor-based devices in the system 100 to provide secure communication services in a correctional facility.

At step 302, user devices are enrolled. The enrolled devices include the user devices 220 (FIG. 2) utilized by correctional facility administrators, inmates and visitors. Enrollment of the user devices renders them self-identifying to the AV services system 120 as authorized devices for use with the system 100. Device enrollment is particularly useful for inmate devices utilized in the correctional facility, while in some cases device enrollment could be considered optional for administrator and visitor devices.

At step 304, facilities are registered so that they can be identified and distinguished from other facilities served by the AV services system 120. In some embodiments, step 304 could be considered optional and need not be performed when for example, enrolled devices at step 302 include facility identifiers for respective devices used in the facility. In other cases wherein the system 100 serves only a single facility, step 304 would simply not apply.

At step 306, facility preferences are accepted by the AV services system. The preferences may be submitted via the administrator interface applications running on administrator devices or via web interfaces accessing the AV services system 120. The facility preferences include aspects of: maximum time limits for use a device by an inmate: selection of types of services made available to the inmates: financial charge information for available services obtained through the AV services system 120; enablement and disablement of certain features offered to inmates and visitors; modification or adjustment of enabled features of the AV service system, inmate devices and visitor devices; and adjustment of monitoring service preferences. Facility preferences may be accepted on a per-facility basis such that, for example, different correctional facilities may independently choose more restrictive or less restrictive settings and vary price points, among other things, for communication services.

At step 308, inmates are enrolled. Inmate enrollment could occur in batches by a facility as an aspect of facility registration. Recognizing that inmate populations change over time, step 308 may occur on an ongoing basis as new inmates enter the population. As inmates leave a correctional facility, they should likewise be removed from enrollment as an aspect of step 308. Enrollment is important to secure operation of the system 100 in that it allows each inmate to be uniquely identified by the AV services system 120. Enrollment may accordingly involve selection or assignment of unique login and password credentials for each inmate authorized to use an inmate device. In some cases known biometric identification tools may likewise be used as an aspect of inmate enrollment.

At step 310, visitors are enrolled. Enrollment of visitors may accordingly involve selection or assignment of unique login and password credentials for each visitor authorized to use the system 100. Visitors are enrolled specifically with respect to identified enrolled inmates, such that each visitor is linked to one or more inmates for purposes of the system 100. Each visitor may therefore communicate with linked inmates, and vice-versa, but may not communicate with inmates that they are not linked to. Step 310 may optionally include approval of each visitor by a correctional facility. Step 310 includes an establishment of a financial account by each visitor to use the offered services on the system.

At step 312, financial account funds are accepted. In contemplated embodiments, prepaid account funds are required to use the services on the system, which may be replenished on the system for continued use. Such prepaid funds may be acquired through a third party payment service in some embodiments. In other embodiments, prepaid funds could be handled by the correctional facility. In still other embodiments, prepaid funds are not required and payment information such as credit card numbers or bank account numbers may be provided for accrued service charges.

At step 314, inmate privilege data is accepted. Services offered by the AV services system 120 would be a revocable privilege to incarcerated inmates. Such inmate privileges are revocable in the sense that they may be granted, revoked or suspended for a definite period of time or an indefinite period of time in view of inmate status and behavioral considerations over time. As such, the same inmate user over a period of time may have privileges (or may not have privileges) to access some or all of the features available via system 100. Likewise, the same inmate user may over a period of time be subject to more or less restriction on certain types of privileges due to inmate status and behavioral considerations. Inmate privileges may be assigned, changed and revoked both individually and with respect to groups of inmates across an inmate population. Accurate and up to date inmate privilege data is important to the secure operation of the system as it effectively imposes a secondary access restriction to an otherwise authorized inmate user.

The data and information that is accepted at steps 302-314 is stored in system databases in order to realize the technical effect of secure access to the system 100 only by authorized administrator, inmates and visitor users and with particular devices for at least some of those users, as well as to provide further information needed for secure operation of the system over time.

Optionally, at step 315 a mobile device may be checked out. The device check-out at step 315 may relate to the optional device kiosk 190 (FIG. 1) that may store mobile devices in a locked manner, with the mobile devices being unlocked only when an authorized inmate offers proper login credentials and when the inmate's privilege to access a mobile device has not been suspended. Alternative types of mobile device check-out may be provided in other embodiments that may or may not involve kiosks. When the inmate accesses a stationary computer terminal or a non-portable device, no device check-out is required and the inmate may merely login to the computer terminal or non-portable device with proper credentials to access the AV services system 120 while privileges to do so have not been suspended.

At step 316, AV services are offered to an inmate who has been identified as an authorized user having current privileges that have not been suspended. Such offered services to inmates include electronic audio/video exchanges with pre-approved visitors in various forms as further described below.

At step 318, a correctional facility administrator with proper login credentials may access live services in use by inmates and monitor the services for security purposes.

At step 320 services are also recorded and stored for later access by a correctional facility administrator with proper login credentials who may monitor the stored recordings for security purposes. In contemplated embodiments communications made on the system are automatically recorded unless a legal privilege prohibits such recording. Accordingly, and for example, a correctional facility administrator can suspend automatic recording at step 306 for a video visitation between an inmate and legal counsel wherein the attorney-client privilege applies. Other legal privileges exist which may vary amongst the locations of different correctional facilities according to state law that likewise will be respected by the system.

At step 322, an inmate returns the mobile device for check-in, and at steps 324 and 326 the mobile device may be securely locked and re-charged for later use by another inmate. Also, as needed, device content may be updated and managed for subsequent use after check-in. Such locking, charging and content management for the mobile device may be performed by the device kiosk 190 (FIG. 1), via another device in an automated manner, or manually in various different embodiments. Content management may including introducing new software apps, removing or updating older software apps, applying operating system updates, etc. Steps 322 and 324 apply to mobile devices only, while step 326 applies to mobile and non-mobile computer devices. If an inmate uses a stationary computer terminal or non-mobile computer device, the inmate user may merely logout of the device when the inmate is finished with it. In some cases, if the inmate does not log out in a predetermined time frame, the device can automatically terminate services and log-out the inmate when an applicable time limit expires. Content management and updates may be scheduled and pushed to mobile and non-mobile devices in batches, preferably in times of non-use.

The steps described for the processes 300 are generally scalable to any number n of user devices in any number of facilities.

Figure 6:
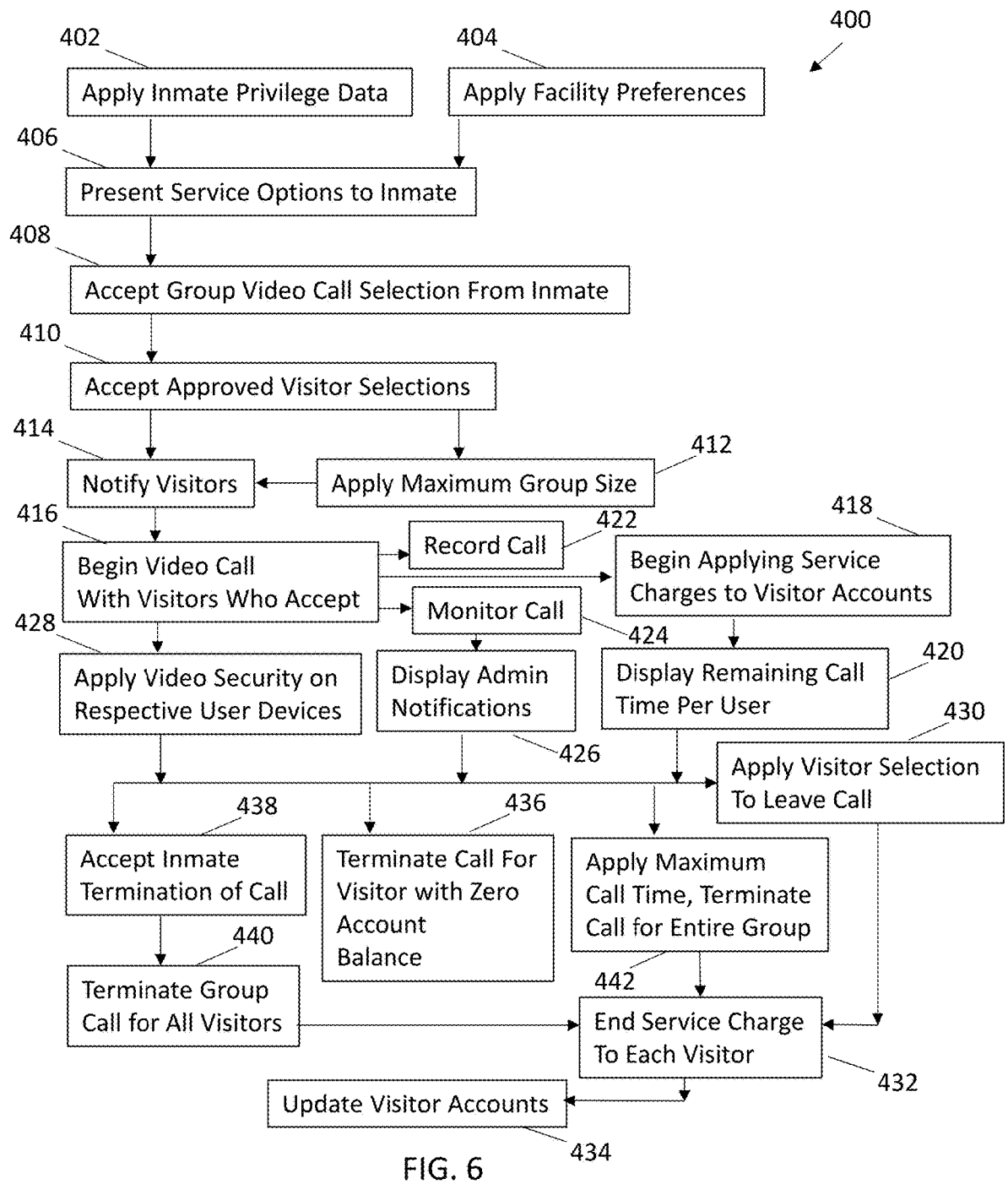
FIG. 6 is a flow chart of exemplary algorithmic processes for providing group video call services via the systems shown in FIGS. 1 and 2 and in the mode illustrated in FIG. 4.

FIG. 6 is a flowchart of exemplary algorithmic processes 400 of providing secure group video call services via the system 100 in the group services mode shown in FIG. 4. The processes 400 allow inmates to securely communicate with their friends and family in a non-singular way to provide a greater sense of normalcy and familiarity when visiting with inmates for users that are familiar with popular group conferencing systems that were designed for use outside of controlled environments but lack security features for use in controlled environments such as correctional facilities and therefore could not be used in correctional facility applications.

At step 402, inmate privilege data is applied to an respective inmate user when logging into an inmate device, and at step 404 facility preferences are applied, each of which impact services and features that may or may not be made available to the inmate via the AV services system 120. Step 402 assumes an inmate that has logged in with valid credentials as an authorized user, and if inmate privileges to use the system have been suspended the method stops at step 402.

The combination of steps 402 and 404 means that different inmate users in the same facility may or may not be able to access the same services from the AV services system 120, and if services are accessed the AV services may operate differently for different inmate users depending on the applied facility preferences. Likewise inmate users in different facilities may have greater or lesser access to some or all of the services available, and may have considerably different experiences with accessed services due to certain features being enable (i.e. turned-on), disabled (i.e., turned off) or with services running with considerably different settings that impact the user experience.

Figure 7:
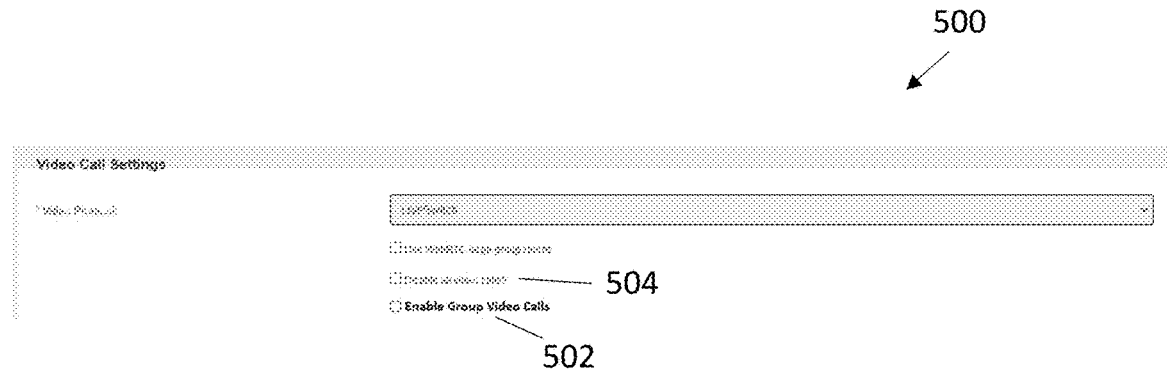
FIG. 7 illustrates a portion of an exemplary administrative user interface graphical screen display including video call setting options for the processes illustrated in FIG. 6 and implemented in the system shown in FIGS. 1-4.

FIG. 7, for example, illustrates a portion of a first exemplary administrative user interface graphical screen display 500 that is presented to a correctional facility administrator via an administrator device. The screen display 500 includes video call setting options 502, 504 in which a correctional facility operator can enable group video calls via a first checkbox or disable all video calls via a second checkbox. Similar display screens are contemplated allowing voice call services and messaging services to be enabled or disabled with similar checkboxes by correctional facility administrators. As such, video calling services, voice calling services, and messaging services (e.g., recorded video messages, record voice messages, text messages, and messages with attachments such as images and emojis) which are available through the system may selectively be enabled (or not enabled) individually or independently in manner that may flexibly meet the needs and preferences of different facilities.

Such enablement or disablement of group services can occur facility wide for all inmate devices and inmate users, or can apply selectively to groups of inmates and inmate devices or to individual inmates and inmate devices. For purposes of FIG. 6, it is assumed that group video calls are enabled at step 404 in order to continue with the process 400. If group video calls are disabled at step 404, the method 400 terminates until group video calls are again enabled.

It is understood that the display 500 could alternatively be presented to a representative of the AV services system 120 (e.g., a HomeWAV representative) which may access the system to enable or disable the respective group services on the behalf of the correctional facility. Any other selection or setting made by a representative of the AV services system 120 would be an aspect of the facility preferences applied at step 404.

Figure 8:
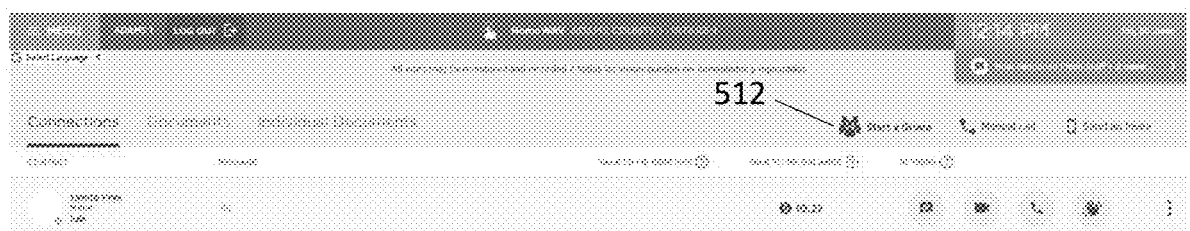
FIG. 8 illustrates an exemplary inmate user interface graphical screen display including a start a group option for the processes illustrated in FIG. 6 and the system shown in FIGS. 1, 2 and 4.

At step 406, options are presented to the inmate to select an available service. FIG. 8 illustrates an exemplary inmate user interface graphical screen display 510 that is presented on the inmate device. The screen display 510 includes a "Start a Group" option 512. In contemplated embodiments such an option to start a group is presented only to inmates when group services are enabled. That is, visitors are not provided with a corresponding option, so only an inmate can start a group. Any possibility of a visitor forming a group with more than one inmate, or for a visitor to form a group that includes non-approved persons to communicate with a particular inmate is therefore precluded as a security safeguard. On the inmate side, only preapproved visitors can be included in a group started by an inmate, and the correctional facility has ability to manage who the preapproved visitors are for each respective enrolled inmate on the system 100.

Figure 9:
FIG. 9 illustrates an exemplary inmate user interface graphical screen display including sub-options for starting a group in the processes illustrated in FIG. 6 and implemented in the system shown in FIGS. 1, 2 and 4.

FIG. 9 illustrates a portion of an exemplary inmate user interface graphical screen display 520 including sub-options for starting a group by an inmate for purposes of step 406 in FIG. 6. The screen display 520 may appear as a pop-up window when the "Start a Group" option 512 from the screen display 510 is activated by an inmate user via tapping it or clicking on it depending on the configuration of the inmate device being used. As shown in FIG. 9, the start a group screen display 520 includes a group voice call 522, a group video call 524, and a group message thread 526. Activation of any of the options 522, 524, 526 by the inmate will respectively start the different types of group services. Activation of the group video call option 524 will be accepted as an inmate selection for purposes of step 408 in FIG. 6.

Figure 10:
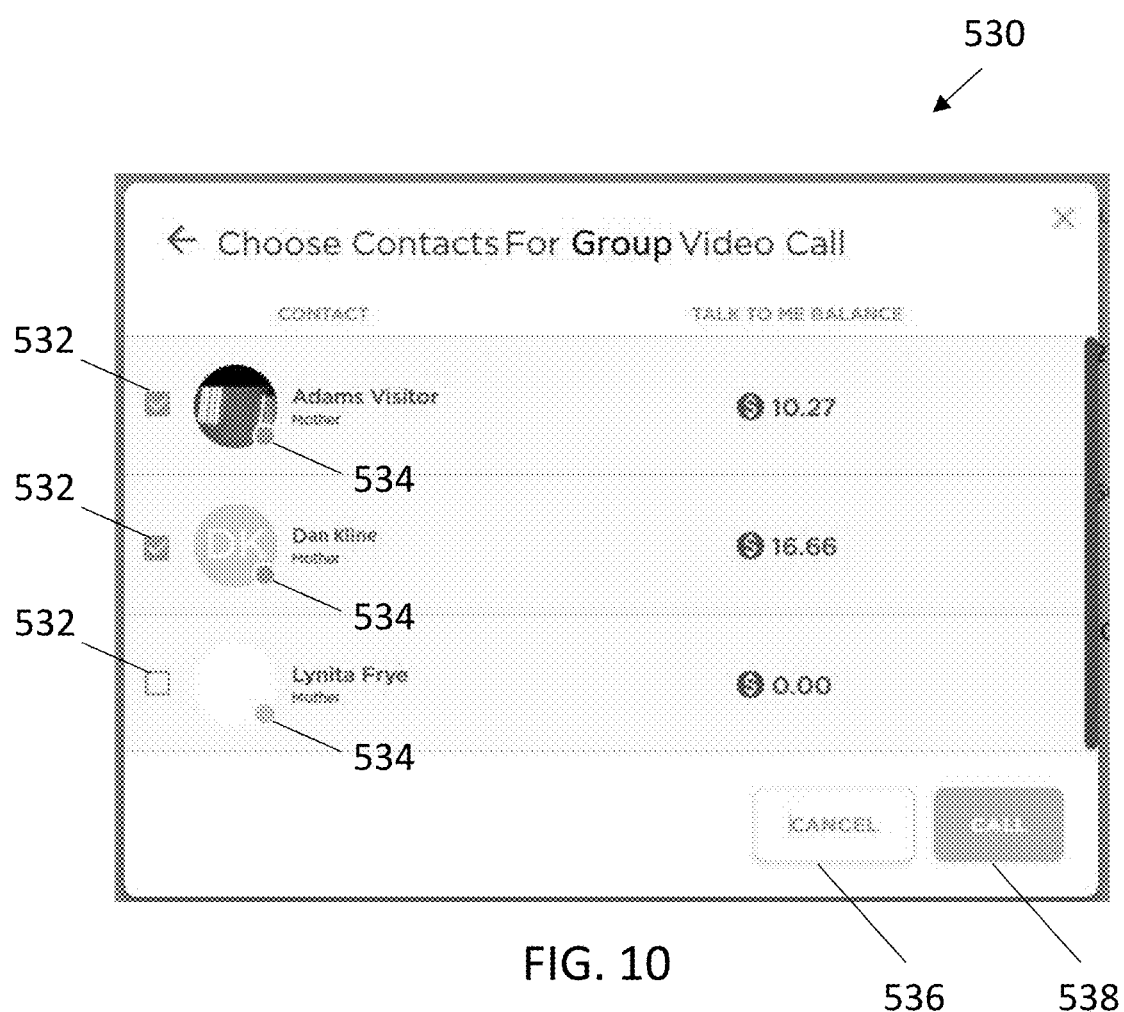
FIG. 10 illustrates an exemplary inmate user interface graphical screen display including contact options for a group video call in the processes illustrated in FIG. 6 and implemented in the system shown in FIGS. 1, 2 and 4.

At step 410 in FIG. 6, the system accepts pre-approved visitor selections for the group video call from the inmate. FIG. 10 illustrates a graphical screen display 530 presented on the inmate device for purposes of step 410. The screen display 530 includes a list of preapproved visitor options for the inmate to select in the group video call. In the screen display 530 visitors may be selected using respective checkboxes 532 as shown. Correctional facility staff can approve or disapprove visitors at any time, so it is important for the system to present an updated list of approved visitors for the purposes of step 410. The updated approved visitor list may be considered an aspect of the facility preferences applied at step 404. Inmates will not be able to add anyone to the group who is outside their approved visitor list, including but not limited to other inmates. Only one inmate will be able to be in any group that is started on the system.

Each of the preapproved contacts are identified by name, relationship, and image or picture that may be selected or applied by the visitor or in some case, by the inmate. Two of three visitors shown in FIG. 3 are also identified as being logged in and available for the video call on the system while the third is shown as being offline and presumably not available. The availability or unavailability of the visitor contacts in the example shown is indicated by color in the respective status circle 534.

As also shown in the screen display 530, the financial account balances for each visitor contact account is shown to the inmate. The three visitor contacts are shown having different account balances, with one of them having a zero balance. The inmate may take the account balances into account when choosing whether to include or exclude a visitor from a group video call. In the example shown, the third video with zero account balance could not participate in the group call without replenishing her account first, which may be a consideration for the inmate in deciding whether to include her at the time the group is being started. For the other two visitor contacts with non-zero but different account balances, each could attend the group video call but the inmate may decide, for example, that it would be more desirable to use the funds of one of them in singular video calls rather than in group voice calls. In general, a higher account balance for a visitor means that the visitor can spend more time interacting with the inmate on the system, so the inmate may choose to prioritize the use of visitor account funds in preferred ways amongst the different voice call services, video call services and messaging services made available through the AV services system 120.

While three visitor contacts are shown in FIG. 10 for a particular inmate, the number of visitor contacts for the inmate to choose from may vary in greater or lesser amounts for other inmate users of the system 100. The system is scalable to accommodate any number n of approved visitors per inmate, although the number of visitors in any group call me be limited as described below. The screen display 530 further includes a cancel button 536 or call button 358 for the inmate's selection to discontinue or proceed with the prospect group video call with the desired visitor contacts.

Via the screen display 530 the inmate can include or exclude some of the approved contacts to form various different combinations of groups amongst the possible preapproved visitor contacts. At step 412 of FIG. 6, however, a maximum group size is applied by the system that limits the number of visitor contacts that the inmate can select when starting a group. As a non-limiting example the maximum group size may be set to 50 total users although higher and lower maximum group sizes are possible in other embodiments. The maximum group size being applied at step 412 is one of the preferences being entered and accepted through step 404. If an inmate attempts to add visitors that would exceed the maximize group size, the system will generate an error message notification to the inmate informing them of the same.

Figure 11:
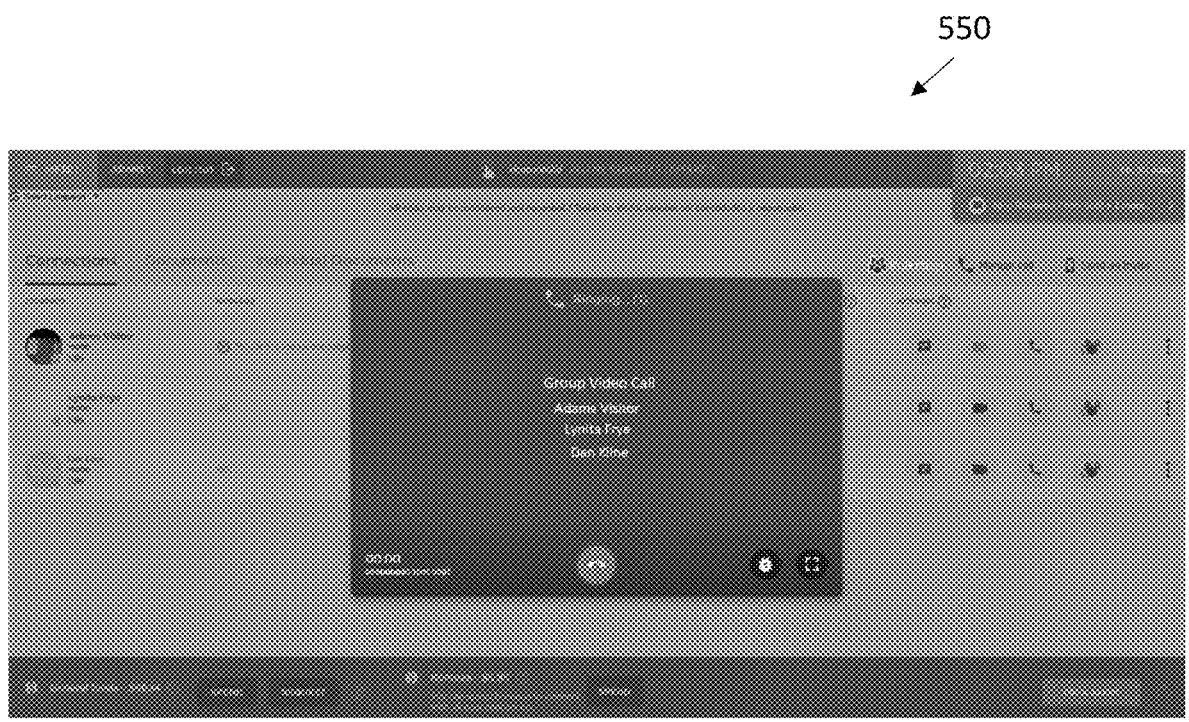
FIG. 11 illustrates an exemplary inmate interface graphical screen display showing a group video call notification for the processes illustrated in FIG. 6 and implemented the system shown in FIGS. 1, 2 and 4.

FIG. 11 illustrates an exemplary inmate user interface graphical screen display 550 presented on the inmate device once the inmate selects the call button 358 in the screen display 530. The screen display 550 shows a group video call notification window to the inmate including a Ringing status, the IDs of the selected contacts, and an option to hang up and terminate the call. If needed or as desired, the inmate user can scroll through and visually see the visitor names of the called participants. In conjunction with the screen display 550, at step 414 in FIG. 6 the system notifies each visitor of an incoming group video call via their designated visitor devices. The notification can be presented on each visitor device through the visitor interface running on the device and may include similar information to the screen 550 by identifying the invited participants of the group, with an option to answer or decline the video call. Each visitor can accordingly accept, decline or ignore the invitation. In the case of a visitor that is offline when the notification is made, acceptance of the call may include login prompts for the visitor as a security precaution.

Figure 12:
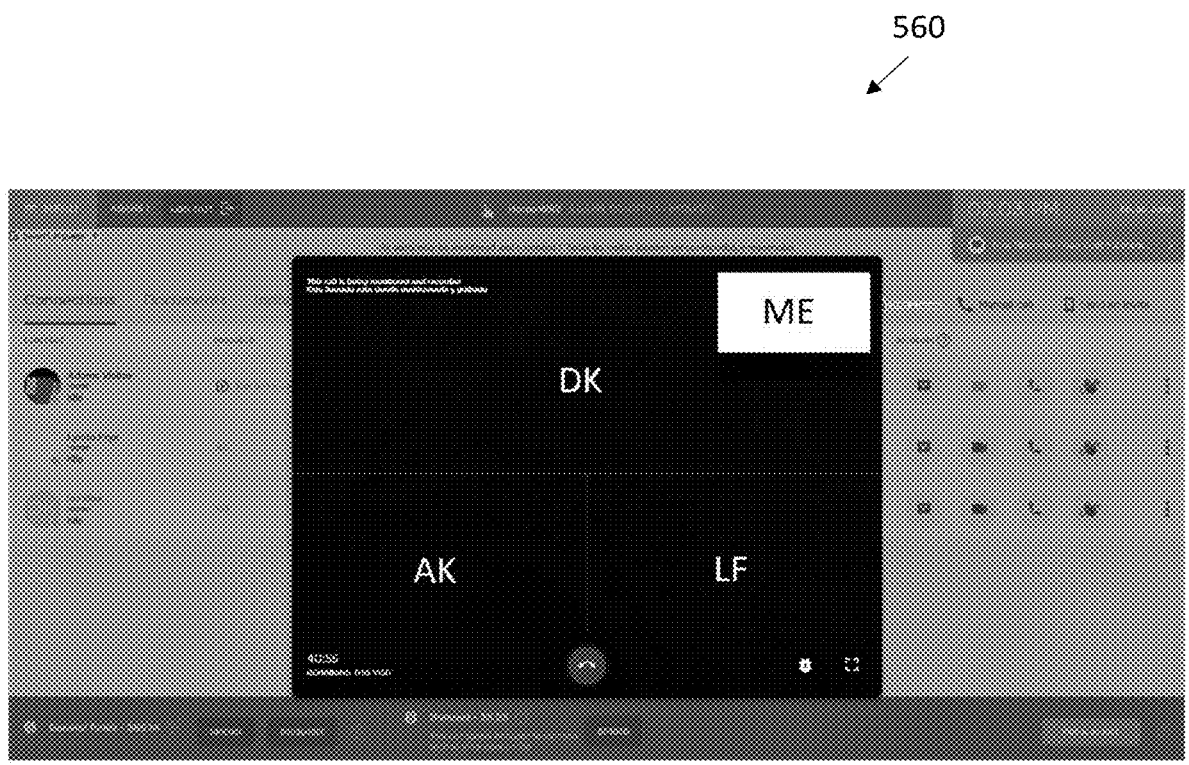
FIG. 12 illustrates an exemplary inmate user interface graphical screen display for a group video call in progress for the processes illustrated in FIG. 6 and implemented the system shown in FIGS. 1, 2 and 4.

At step 416, the group video call begins when one or more of the invited visitors accepts the call. The beginning of the call includes setting up on online meeting room and admitting each participant (inmate or visitors) entry to the meeting room. Visitors will have a limited amount of time to accept and join the call, or else the call will start without them. Optionally, at the beginning of the group video call at step 416, notifications are sent via email, text message or other preferred medium to predetermined correctional facility administrators that a group video call is beginning. FIG. 12 illustrates an exemplary inmate user interface graphical screen display 560 for a group video call in progress. The admitted inmate is indicated as "ME" while each admitted visitor is indicated with their initials. The video feeds in the screen display 560 for the group participants are not yet active in the meeting room, but will either be automatically established or manually turned on by each group participant after admittance into the meeting room. Thereafter, once the video is activated on each user device, each user may see and speak to each other in group form for an enhanced but still secure video conference experience for the inmate user. The display 560 may be configurable by each user to change the arrangement or relative prominence of the video feeds for the group users present.

At step 418, the system begins applying services charges to each visitor account for respective visitors that have accepted the call and joined the group. Visitors who declined the call or ignored the call notification are not charged. In contemplated embodiments the service charges for the group video call are a set charge per minute (e.g., $0.20 per minute) with each visitor that accepted the call being charged the same rate. As shown at step 420, a remaining call duration is calculated and displayed on a per-user basis based on the funds in each respective visitor account. Each visitor will see the remaining time left of their call based on only their own account balance. As such, different visitors will see different remaining call durations displayed. All visitors will have the opportunity to replenish accounts by, for example, purchasing additional minutes to extend their remaining call duration.

At steps 422 and 424, following automated establishment of the meeting room and admitted entry of group participants at step 416, unless the call is exempted from recording due to legal privilege the system automatically records the group video call (with appropriate notification to the group participants as they join) as well as make the call available for monitoring by a facility administrator.

Figure 13:
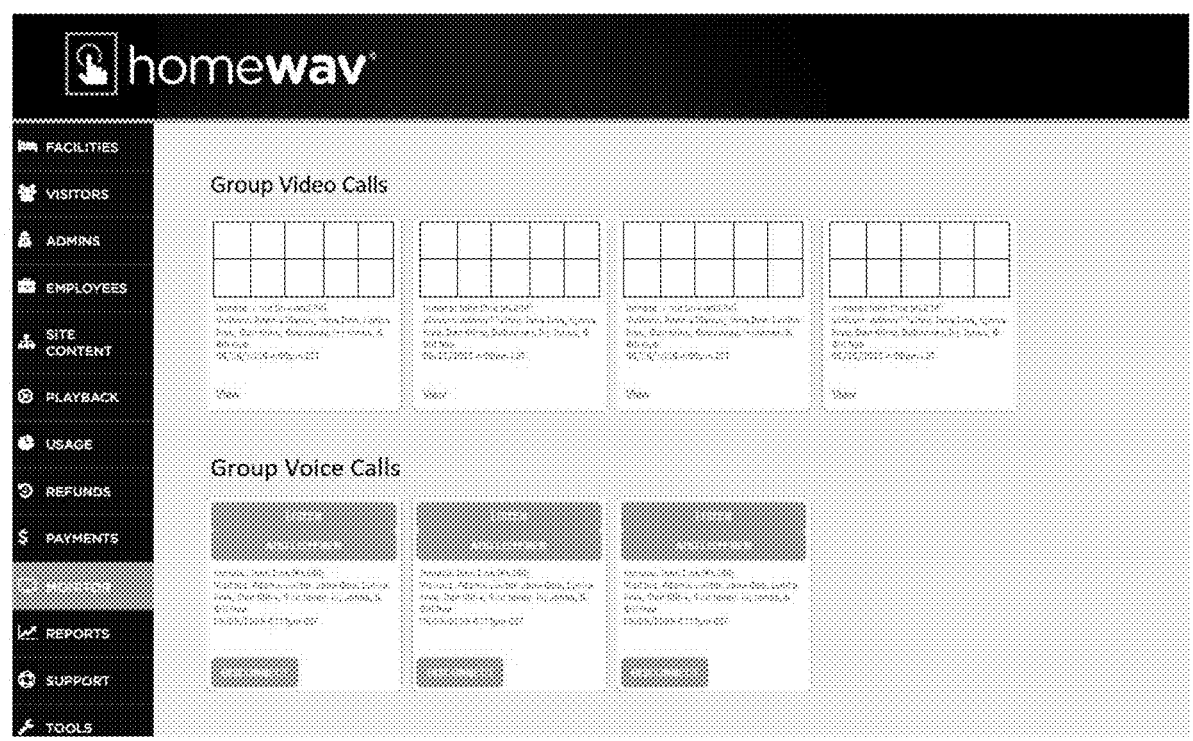
FIG. 13 illustrates an exemplary administrative user interface graphical screen display including call monitoring options for the processes illustrated in FIG. 6 and implemented the system shown in FIGS. 1-4.

FIG. 13 illustrates an exemplary administrative user interface graphical screen display 570 including call monitoring options for a correctional facility administrator. In the example shown, four group video calls and three group voice calls are shown to be in progress for the administrator's review. Information is included for each call for the administrator to quickly see the inmates and visitors involved in each call and the time that each call started. A call preview is shown for each call including relevant call details such as the inmate who started it, the visitors actively in the group, when the call started, and from what pod.

The administrator can activate the respective buttons on the screen display 570 to view a group call in progress or to listen to a voice call in progress. Live monitoring as well as monitoring of recorded calls is advantageously made available to correctional facility administrators. In the course of live monitoring, as shown at step 426 administrators can send notifications to the group concerning any appropriate instructions or warnings in view of observed events on the monitored call. Any notifications generated at step 426 will be displayed to all group users on their respective devices. An admin may also terminate the call and if they deem necessary, issue account suspensions to any visitor or inmate that was participating.

Correctional facility administrators can also review recorded calls on demand after the calls have concluded. The administrator can play the recorded call, download it, add notes, and share the call with external resources as appropriate.

At step 428 in FIG. 6, from the beginning of the video call at step 416, the system applies video security image processing on one or more of the respective inmate devices and visitor devices to provide additional security safeguards for mobile computer devices used by the inmates and/or visitors. The video security image processing utilizes a combination of human face detection and filtering, background blur and image replacement, and camera proximity to detected human faces to render the use of the mobile computer devices more secure and effectively overcome the security issues described above with respect to persons, items and content that may be undesirably captured in the field of view of movable cameras. The video security image processing is described in further detail below. In contemplated embodiments, the video security image processing which is applied to video feeds on the call may be made available to correctional facility administrators for live monitoring of calls as well as in recorded video calls for subsequent monitoring.

Once the group video call has started, each user in the group will enjoy an experience similar to other video calls available from popular commercial platforms that cannot securely be used in correctional facility applications. Each member of the group will be able to see and hear all the other members of the group. The video call may continue with all participants in the group that joined the call until one of the following events occurs.

At step 430, the system may accept a visitor option to leave a call. This may occur by the visitor activating a corresponding selection option on a screen display presented to the visitor. Any visitor may leave at any time desired, and once the option is exercised the visitor's connection to the online meeting room is terminated. As shown at step 432, service charges are ended for each visitor as they leave the call, and at step 434 the visitor's account is updated to the current balance after the visitor leaves the call. At the time of departure of any visitor, if additional visitors and the inmate wish to continue with the group video call they can, and additional visitors can leave at any desired time with similar results via steps 430, 432 and 434 that apply to each visitor who leaves.

As shown at step 436 for any visitor whose account falls to a balance of zero, the system automatically terminates the visitor's connection to the online meeting room. This can happen to different visitors at different times during the course of a group video call. Notification can optionally be sent to remaining users on the group video call as visitor connections are terminated due to lack of funds in their account to continue. In a contemplated embodiment, visitors will be charged for group video calls based on a standard service price plan that is the same for a singular or 1 on 1 video call. For example, if the service is set to $0.20 per minute, each visitor who joins the call will be accessed this price until they leave, run out of funds, the max call time is reached, or the inmate ends the group. The available call time will vary for different visitors depending on their account balance.

As shown at step 438, the system may accept the inmate's choice to end the group video call. The inmate may choose to end the call via selection of an appropriate option to do so presented on the inmate device. Once accepted, the inmate's selection to terminate the call automatically causes the system to terminate the call at step 440 for any visitors that are still present by ending each visitor's connection to the online meeting room. Service charges are accordingly ended for each of the visitors and their accounts are updated at steps 432 and 434. By virtue of steps 438 and 440, visitors will not be able to remain on the group without the inmate.

As shown at step 442, if the inmate has not ended the call prior to the maximum determined time limit, the system automatically terminates the call for all group users when the maximum call time limit expires. The maximum allowed call may be determined by each facility and is customizable to each individual facility and service via options presented on correctional facility administrator devices. In a contemplated embodiment, the maximum time limit for a group video call may be set to 20 minutes, although greater or lesser amounts of time may be adopted in other embodiments as desired. When a call is terminated for expiration of maximum time at step 442, service charges are accordingly ended for each of the visitors in the call at the time, and each of the visitor accounts is updated at steps 432 and 434.

Exemplary processes performed by the system 100 for secure group voice call processing would be similar to those described above for the group video call processes in the method 400, except that instead of accepting a group video call selection from an inmate as described above the system would instead accept a group voice call selection. Likewise, instead of beginning a group video call the system would begin a group voice call, and the video security image processing would not apply to a group call. Group voice calls could be monitored and terminated in a similar manner to the group video calls. As a non-limiting example, a correctional facility could choose to set the maximum call time for a group voice call to a different time limit (e.g., 15 minutes) than the set maximum time limit for a group video calls (e.g., 20 minutes). The time limits are customizable to flexibly meet the needs and preferences of different facilities.

Figure 14:
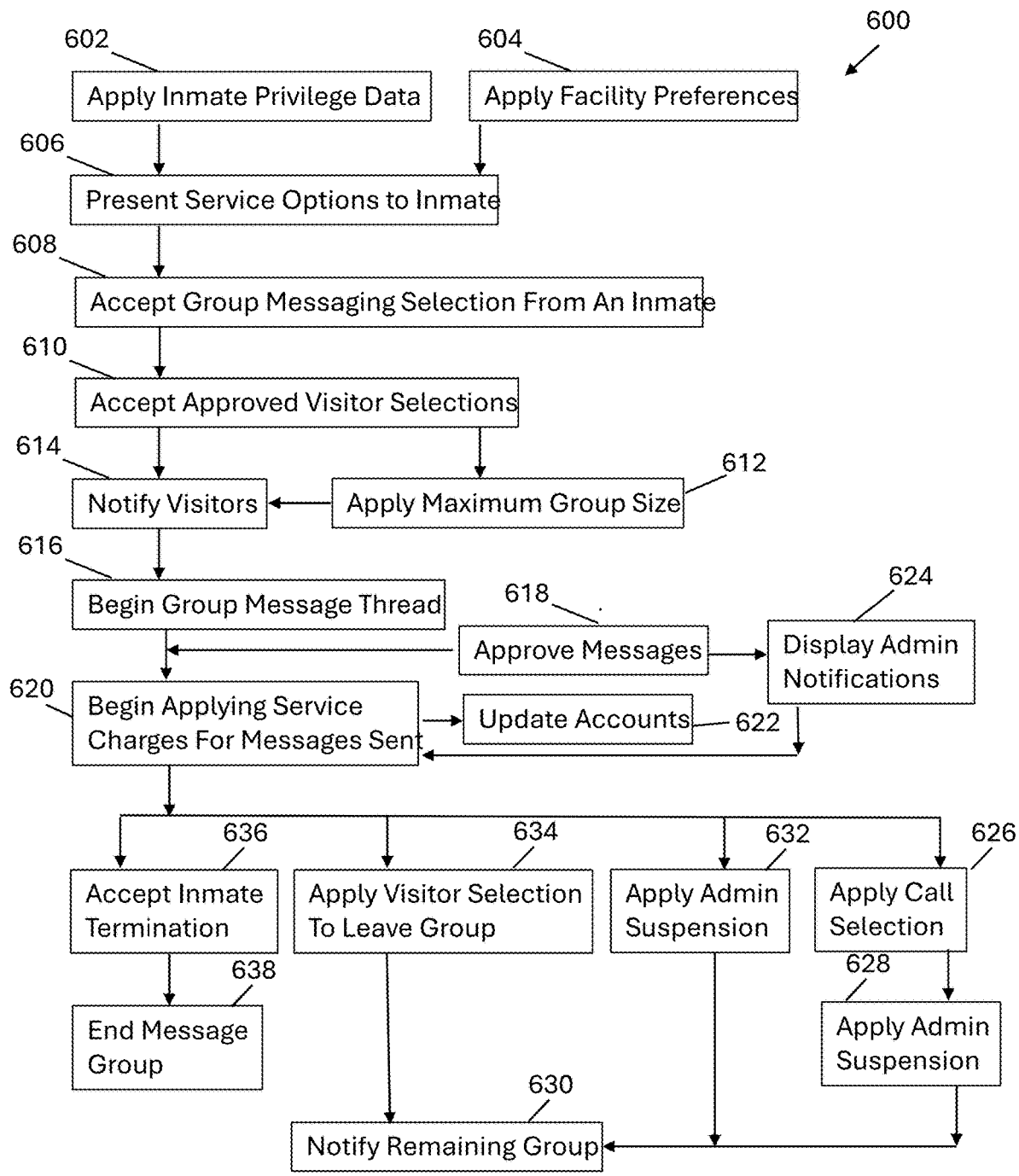
FIG. 14 is a flow chart of exemplary algorithmic processes for providing group messaging services via the systems shown in FIGS. 1 and 2 and in the mode illustrated in FIG. 4.

FIG. 14 is a flow chart of exemplary algorithmic processes 600 of providing secure group messaging services in the system 100. The method 600 includes steps 602, 604 and 606 that are similar to steps 402, 404 and 406 of the method 400 described above except for the application of group messaging services rather than group video services. At step 608, the system accepts a selection of group messaging service from the inmate, which may be obtained via the message option 526 in the screen display 520 of FIG. 9.

Accepting approved visitors for the desired message group at step 610, applying maximum group size at step 612 and notifying visitors at step 614 may be made in a manner similar to the steps 410, 412 and 414 except for the application of group messaging services rather than group video services.

At step 616, a group message thread is established and any user may post a message. Users in a group message thread will then have the ability to use any of the messaging services that are available at the facility where the inmate is incarcerated. For example, a user could post text, video messages, voice messages, GIFs, images, and emojis.

Optionally, at step 618 any submitted message is approved before the message is posted to the group. Message approval may entail manual approval of the message by a correctional facility administrator via an administrator device, or by an automated content filtering application that checks for inappropriate word usage or other analysis on submitted messages as a security safeguard. After messages are posted, a correctional facility administrator can see the group message thread and review all available messages. Administrators may selectively exercise options to hide any unwanted messages from the group's view. Based on actions performed by an administrator on a message (i.e., accept, reject, hide) the poster of the message, and perhaps the entire group may optionally be informed via an appropriate notification that may be seen by some or all of the users in the group.

At step 620, once the message group is started, charges for posted message begins. In contemplated embodiments, each visitor is charged for a message posted to the group thread by that visitor, and the visitor's account is updated at step 622 to account for the charge. The rest of the users can see the posted message without charge. Each of the different messaging types (e.g., text, video messages, voice messages, GIFs, images, and emojis) may be set to varying prices depending on the facility. Optional notification and prompts may be appropriately implemented in the system and method to advise users of charges before the message is posted and charges are actually incurred.

At step 624, a correctional facility administrator monitoring the group message thread can send notifications to the group via a posted message on the thread, via pop-up windows, or in any other suitable manner to communicate with message group participants.

Figure 15:
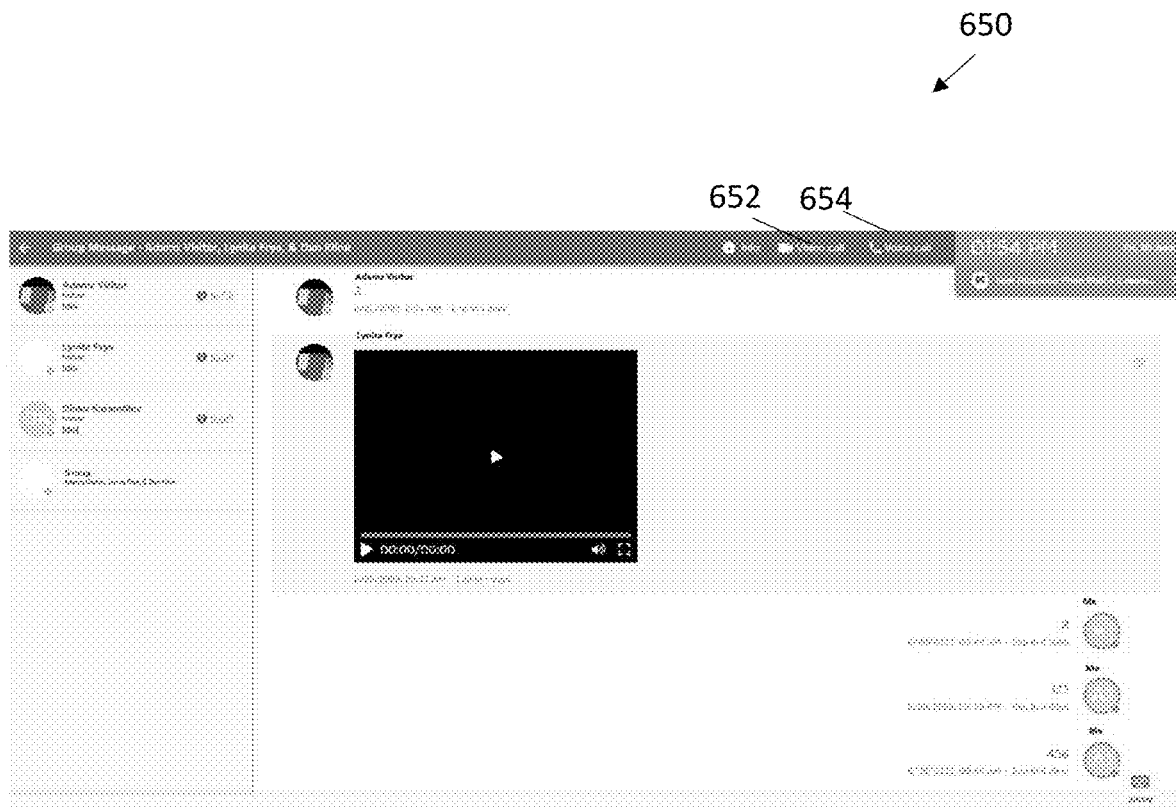
FIG. 15 illustrates an exemplary inmate user interface graphical screen display including group messaging features for the processes illustrated in FIG. 6 and implemented the system shown in FIGS. 1, 2 and 4.

At step 626, the system may accept a call selection from an inmate made through the group messaging service. FIG. 15 illustrates an exemplary inmate user interface graphical screen display 650 including group messaging features including options 652, 654 to start a video call or a voice call. Since the group is already established with approved persons, the system can ring (i.e., send notifications and invitations to accept or decline a call) all of the visitors in the group, and start video calls or voice calls with any visitor member of the group that accepts and joins the call as described above.

At step 628, a correctional facility administrator may suspend one or more participants of the group video call, or terminate the call for the entire group for security reasons. If a visitor is suspended, notification is sent to the remainder of the group at step 630.

As shown at step 632, the correctional facility administrator may likewise suspend one or more participants of the group message thread in response to posting of inappropriate messages, and if needed the correctional facility administrator may terminate the message group for security reasons. If a visitor is suspended, a notification is made to the rest of the group 630 for information purposes and to possibly deter others from engaging in similar behavior underlying the suspension.

Apart from possible intervention by a facility administrator to terminate a message group, once the group message thread is started the system may accept a visitor selection to leave the group at step 634. Any visitor may leave the group at any time, and as each visitor leaves, notification will be placed in the chat saying which visitor has left.

If the inmate chooses to end the group, the system accepts a corresponding selection of an option to do so at step 636. For example, an inmate can end a group message at any time by deleting the group via an option to so in a screen display on the inmate computer device. In response to such selection from an inmate, the system automatically terminates the group. Notification of group termination can be sent to any affected visitor, and no one in the group prior to its termination will be able to view or send messages to the group after its termination.

FIG. 16 is a flow chart of exemplary algorithmic processes 700 of secure group video call scheduling by a correctional facility administrator with the system 100. Such scheduling processes may be particularly beneficial for use of the system to accommodate third party purposes, including but not necessarily limited to third party purposes such as legal proceedings where multiple remote parties may desirably join a group video call in a manner that eliminates logistical issues, expense and resource allocation to physically transport an inmate to court. Such video calls may be particularly beneficial for court arraignments or trials, but other third party meetings requiring an inmate may also be scheduled as desired. For purposes herein, "third party" shall mean a person (or group of persons) other than a friend or family visitor that the inmate may be required to meet or that the inmate may desirably meet without having to be physically transported outside of the correctional facility.

At step 702, the system accepts a group video call selection by an administrator via an option presented on a screen display on an administrator device after the administrator logs into the system with valid credentials. In contemplated embodiments, only certain ones of correctional facility administrators may have such an option presented as a security safeguard. Tiers of correctional facility status may be assigned on the system allowing some administrators to access certain features that others cannot, and such assignments may be an aspect of facility and administrator enrollment or registration. In some cases, certain administrators may assign access rights to other administrators as an aspect of facility preferences that are accepted as predicates for the operation of the system in the facility.

At step 704, the administrator may proceed to select an inmate for the group video call. Lists of inmates may be provided to the administrator on an administrator device for such purposes and check boxes may be provided for example to select an inmate. As another example, the administrator may be provided a fill-in data field to partly identify the inmate (via name or other ID assigned by the correctional facility) to begin a filtering search process by the system to retrieve inmate matches from a system database. Any suitable means for the administrator to locate and select an inmate may be implemented, but as a rule the system only allows one inmate to be selected for a group video call as a security safeguard.

At step 706, the system accepts a date and time selection for a proposed group video call including the inmate. Time and date options may be provided in any suitable manner on an administrative device for the administrator to make the selection. The date and time selection may optionally include the length of the call for further scheduling purposes, and a specific location and specific inmate device that may be reserved for the group call. Reservation of the location and device in the correctional facility is important to ensure that the scheduled group video may proceed on time without interrupting another inmate's use of the location or device.

At step 708, the system accepts visitor selections from the administrator through options presented on the administrator device. The administrator may select from approved visitors in a manner similar to an inmate's selection of visitors described above or in any other suitable manner. In the case of visitors who are not enrolled with an account to use the group services of the system, the administrator may directly enter visitor information as an exception to the normal process for visitor enrollment when such visitors do not merit security review or concern such as court staff including but not limited to a judge, and legal counsel and staff including but not limited to prosecutors and defense counsel. Court hearings may therefore be conducted through the system as group video calls for the convenience of all parties, and the system does not apply charges to scheduled group video calls that relate to legal proceedings or consultation with legal advisors.

Once all the visitors are selected for the group video call, the administrator can elect to proceed with scheduling via an option presented on a screen display of the administrator device. This will cause the system to generate scheduling notifications to all group participants at step 710 which may operate as invitations that can be accepted or declined by the recipient. In cases where the inmate is required to attend for legal reasons, the inmate is automatically scheduled without requiring any inmate action to accept. For visitors, scheduling notifications may be made via the system to enrolled visitors or via email for visitors that are not enrolled, such as court staff, prosecutors and defense attorney's and associated legal staff. The scheduling notification may be sent in any desired manner for acceptance by visitors outside of the correctional facility.

At step 712 the system confirms acceptances of invitees. If a required invitee does not accept, a notification or alert can be provided to the correctional facility and other members of the group who have accepted in case additional notifications or corrected notifications need to be resent, including but not limited to notifications of a rescheduled group video call at another date and time in view of a required invitee that is otherwise not able to attend.

While not shown in the processes 700 a cancellation option is also made available to a correctional facility officer to cancel a scheduled group video call for any appropriate reason. If the administrator exercised such option, the system would accept the selection and proceed to notify all the users in the group that would have been on the call. Such notification of cancellation is important to keep the users informed and make sure they do not attempt to join the call.

FIG. 17 illustrates exemplary algorithmic processes of completing a scheduled group video call in the system 100 via the method 700 described above.

At the scheduled date and time, the inmate is brought to a location where the inmate may access one of the inmate computer devices made available in the correctional facility, and in some embodiments the inmate may also access a reserved inmate computer device. At step 752 the inmate logs in with credentials as an authorized user via the inmate computer device. At step 754 a selection from the inmate is accepted by the system to start the scheduled group video call. The online meeting room is accordingly established and the inmate and outside visitors for the group call are admitted into the online meeting room. Optionally, at step 758 video security image processing is applied to at least the inmate computer device as a security safeguard. At step 760 the system accepts an inmate selection to end or terminate the call, after which the online meeting room is terminated and the user devices for the group cease any operative interconnection. Only the inmate can start and stop the group video call as a security feature, while any connected visitor on the group video call may leave the call before the inmate acts to end it for the remaining group.

Figure 18:
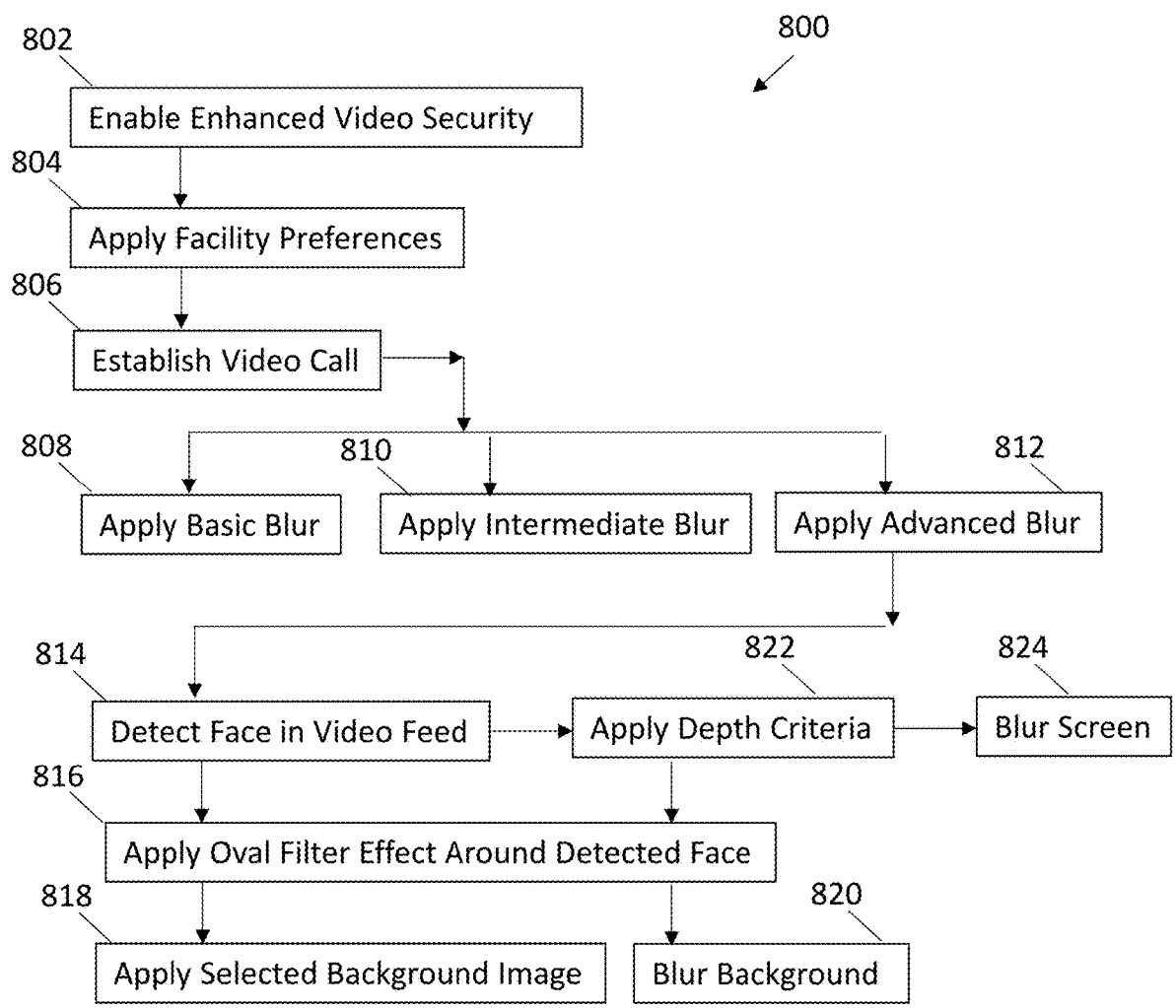
FIG. 18 is a flow chart of exemplary algorithmic processes for enhanced video security in the operation of the systems shown in FIGS. 1-4.

FIG. 18 is a flow chart of exemplary algorithmic processes 800 of enhanced video security image processing to more effectively meet the security needs of a controlled environment such as a correctional facility in the provision of live electronic audio/video exchanges. The processes 800 are applicable to the operation of the system 100 (FIGS. 1 and 2) in the singular mode (FIG. 4) and the operation of the system 100 in group services mode (FIG. 4). The processes 800 specifically apply in the processes 400 at step 428 (FIG. 6) for group video call services, the group messaging processes 600 at step 626 and 628 (FIG. 14) where group video calls may be accessed, and in the processes 750 at step 758 for a scheduled group video call. In the singular service mode of the system 100 as shown in FIG. 3 wherein a video call may be conducted between a single inmate and a single visitor via respective inmate computer devices and visitor computer devices, the processes 800 may be integrated into the singular video call process as detailed in U.S. application Ser. No. 17/576,319 which is incorporated by reference above.

The processes 800 may be implemented in the video security components 250 (FIG. 2) of respective ones of the user devices 220 and/or in video security components of the AV services system 120 to beneficially address the security implications and concerns introduced by mobile computer devices in providing both singular services and group services in the system 100. The benefits of the processes 800 are not entirely limited to mobile computer devices, however, and could instead be applied to stationary computer terminals and the like with a field of view of the camera that may present some of the same issues and therefore benefit from the enhanced security safeguards of the processes 800. Image-based detection techniques, operative upon video feeds and frames captured by the video cameras of one or more of the user devices in a singular or group video call may be utilized to enhance the secure use of mobile computer devices in the operation of the system. Such image-based detection techniques may be implemented in algorithmic form in computer code to accomplish the objectives described below At step 802, the enhanced video security features are enabled via an accepted selection in the facility registration or accepted as an applied preference by a correctional facility administrator via an option presented on a screen display of an administrator computer device. In contemplated embodiments, the enhanced video security features in the system can accordingly be turned on and off to meet facility preferences on a facility-wide level such that the video security features are available or not available in all of the connected inmate and visitor computer devices associated with each facility. In contemplated embodiments the enhanced video security image processing may be enabled and therefore run only on inmate devices, only on visitor devices, or on combinations of visitor devices and remote devices to flexibly meet the particular needs and preferences of different facilities. A screen display similar to that shown in FIG. 7 may be used to accept a selection to enable or disable the enhanced video security processes. Enablement of the video security is applied as a facility preference at step 804 together with the various other facility preferences selected via the other processes described above or in the applications incorporated by reference herein. Given that the preferences of different facilities may vary markedly from one another, the user experiences may likewise be noticeably different even though the services are running from the same system.

In alternative embodiments, the video security features may be selectively turned on or off with respect to some groups or sub-groups of enrolled inmates but not to others in the same facility. In such a case, the operation of the video security features will apply or not apply depending on the identity of an inmate or visitor user logging into the system via the user device and the group status of the identified inmate or visitor user. The video security features may likewise be applied or not applied to individual inmate or visitor users who are identified at login. Screen display's including such options to select devices or inmate and visitor users as groups or individuals may be appropriately included for use by correctional facility administrators.

In the case of inmate devices, when an inmate logs into the system via one of the inmate computer devices, the enhanced video security features will automatically apply (or not apply) to a singular or group video call depending on whether the video security features are enabled or disabled on the inmate device or whether they are enable or disabled for the particular inmate user. Because this is a key security feature for the controlled environment, an inmate has no access to enhanced video security settings and cannot turn them on or off or modify video security settings in any way.

In the case of a visitor device, when a visitor logs into the system via a visitor computer device, the enhanced video security features will automatically apply (or not apply) to a singular or group video call depending on whether the video security features are enabled or disabled on the visitor device or whether they are enabled or disabled for the particular visitor user. Because this is a key security feature for the controlled environment, visitors have no access to enhanced video security settings and cannot turn them on or off or modify video security settings in any way.

At step 806, a singular or group video call is established via the processes described above or in the application that is incorporated by reference. As described above, group video conferencing may be enabled or disabled at the option of the facility, and such option will be applied for purposes of step 806. As such, an inmate user of the system may or may not be presented with a group video call option, and when the inmate is not presented with a group video call option, no group video call can established at step 806. When the inmate option to start a singular video call or a group video call is presented, the video call established at step 806 will correspond to the inmate selection.

When the video call is established at step 806, video feeds are generated between an authorized inmate user and an authorized visitor or authorized visitors in a singular or group video call with respective user devices and the associated cameras. The video feeds include image frames that can be processed in one of a variety of different modes with different results. As shown in FIG. 18, the image processing applied may provide basic security at step 808, intermediate security at step 810, and advanced security at step 812. Which of these three degrees of image processing and security will apply to any given video call may be an aspect of applied preferences by the facility at step 804. The correctional facility may therefore choose to enable or disable security image processing as a whole per step 802, and may further choose to selectively apply or not apply one of the three different types of image processing on a per-service basis or a per-user basis. As such, and for example, different types of security image processing may be applied to group video calls than to singular video calls, and different users on the same video call may be subject to respectively different types of image processing.

At step 808, in a contemplated example of the basic image processing, the inmate or visitor user is transmitted in the video feed without change while anything other than the inmate or user in the video feed is blurred or filtered so that anything in the background of the images is not clearly transmitted in the video call. In other words, the inmate or visitor user is unblurred or filtered, while anything else in the images of the video feed is blurred and filtered. This effectively alleviates security concerns that relate to content in the background of the images of the video feed when the field of view of the camera in a user device cannot be controlled or wherein the background environment cannot practically be managed in the use of a mobile computer device by a user.

At step 808, the images are processed with object recognition techniques that detect the shape of the human form, and therefore will identify the user's head, neck, shoulders, torso and any other portion of the human body that is visible in the images of the video feed. As such, the head, neck, shoulders, torso and any other portion of the human body that is visible in the images of the video feed will be unfiltered and will be transmitted in the video feed, with the rest of the video feed apart from the user's body will be filtered and blurred from view. As described further below, instead of blurring, the system may likewise replace the background with an image to realize a similar beneficial result in eliminating security issues that relate to the background of the video feed.

Also at step 808, if a second person appears in the video feed, the image processing would perform similarly to the first person and would transmit the body of the second portion while blurring the background apart from the first and second person. A third person would likewise be recognized and transmitted in the video feed with the first and second person while the background of the video feed that does not include the persons is blurred. As such, anyone else, apart from the authorized user inmate or visitor who appears in the image frames of the video feed is also unblurred in the same capacity as the authorized user. Multi-party participation in video feeds are sometimes not objectionable such as, for example, a group video call including a partner/spouse and child of an inmate, regular events such as religious services, or a special occasion call (e.g., a birthday, a holiday, a funeral service) where family and friends may beneficially participate in a group call who are not expected or required to become enrolled visitors for purposes of the system, are not expected to use separate devices to participate in a group call, and/or when potential security concerns can be mitigated in another way by live monitoring and the like.

The features of the basic image processing at step 808 therefore address security issues relating to certain types of unsecure content in the background of the video feed, but not nudity issues or unauthorized participants. Step 806 is therefore considered "basic" image processing that improves security of a video call vis-a-vis a video call that otherwise does not have it, but does not completely address other specific concerns for certain controlled environments or correctional facilities. Nonetheless, the basic image processing at step 808 may satisfy the security concerns of certain facilities with respect to certain users and remove objections to the use of mobile computer devices that otherwise may exist in relation to video calls.

At step 810, an intermediate image processing is applied that is similar to the basic blur at step 808, but will only allow a single user (i.e., only one user) to be in frame. As such, when one user is present in the video feed the processing at step 810 will transmit the user's body and filter the background with blur or image replacement. If a second person is detected in the video feed, however, the entire video feed (i.e., the entire screen or entirety of the images) will blur/filter or be replaced with an image. If the second detected person steps out of the camera view and is therefore no longer detected in the video images, the system will revert to transmit the one user's body and filter the background with blur or image replacement. The intermediate processing therefore adds to the basic image processing by effectively preventing a second, unauthorized person from joining a video call. The intermediate image processing at step 810 therefore improves security of a video call further than the basic image processing, but still does not completely all of the specific concerns that may exist in certain controlled environments or correctional facilities. Nonetheless, the intermediate image processing at step 808 may satisfy the security concerns of certain facilities with respect to certain users and remove objections to the use of mobile computer devices that otherwise may exist in relation to video calls.

At step 812, advanced security image processing is applied. The advanced image processing improves security of a video call further than the intermediate image processing to the point of addressing all of the security concerns that may exist in certain controlled environments or correctional facilities. The advanced security image processing at step 808 may accordingly remove all objections to the use of mobile computer devices that otherwise may exist in relation to video calls.

In the advanced image processing, a user's face may be detected in the video feed at step 814. Specifically, when the enhanced security features are running on an inmate computer device the face of the inmate is detected, and when the enhanced security features are running on an visitor computer device the face of the visitor is detected. Known image-based processing techniques are applied to make the face detection.

At step 816, the system applies an oval filter effect around the detected face in each video feed where advanced image processing is enabled. The oval filter effectively conforms to and surrounds the user's face and provides an oval boundary outside of which the video feed may be altered or replaced for security purposes, while inside of the boundary which almost exclusively includes the detected face the video feed is unaltered or unchanged. The oval boundary is centered around the user's face and is roughly the same size as the detected face that is likewise oval shaped. Therefore the oval boundary will contain the image of the detected face, typically the face of the approved inmate or approved visitor in the use of the system, while excluding any other portion of the user's body (e.g., neck, shoulders, torso, etc.) that lies outside of the boundary. While oval shapes are described, boundaries can be implemented that are not necessarily oval while otherwise serving the same purpose and effect of targeting the user's face for transmission in the video call while excluding other portions of the user's body.

At steps 818 or 820, the area outside the boundary of the oval filter may be entirely replaced with a selected background image or may be entirely blurred so that the area outside the oval boundary are no longer seen or cannot be seen clearly. Since the area outside of the boundary corresponds to all of the associated background in the video images apart from the user's face, all security concerns related to undesirable content captured in the background of the camera's field of view are overcome. The detected face of the user is, however, clearly seen by other users of the group and is sufficient to provide the desired interaction between participants on the video call.

In both cases of background image replacement and background blurring, the approved user's face is clearly seen in the video feed that is passed through to another user device in a video call, but anything in the background is hidden or obscured in the video feeds. As such, if the inmate or visitors users move about or change the position of the device and the camera's field of view in the device, intentional or inadvertent capture of other persons or inappropriate items in the background of a video feed cannot occur and otherwise improper behavior on a video call is thwarted. The other users on the video call will see the detected face only to allow otherwise unimpeded interaction on the video call while eliminating security concerns that otherwise may exist with respect to possible "unsecure" content or activity in the background. By removing possibly "unsecure" content the video call is now secure at all times.

For example, because the oval filter effect and background image replacement or blur operates to only transmit the user's face to others on the call, any intentional inmate or visitor nudity cannot be transmitted on the call since no other portion of the user's body other than the user's face is seen by the other users in a video call. Likewise, a nude person in the background of a video feed generated by a user device, which may inadvertently occur in the use of mobile devices by inmates and visitors such as by unknowingly walking by and capturing someone in the background who may be showering or dressing/undressing, is entirely precluded because the background of the video feed is not transmitted to any other device in the video call when background image replacement is applied or blurred to an extent that another user of the system cannot see any nudity that may be present. Illegal activity, any subterfuge attempts to communicate via objects, or any inappropriate content in the background of a video call cannot possibly be transmitted to other system users when only the user's face is made visible to other approved users in a video call.

Aside from nudity and inappropriate behavior or content, the oval filter effect and background image replacement or blur further operates to securely preclude third parties from being captured in video feeds used by otherwise approved system users. Such third parties may include, but are not necessarily limited to correctional facility staff, public bystanders, minor children or any other person that has not consented or that raises security concerns. Any third parties in the background of a video feed are replaced by the image and are therefore not seen at all, or are blurred to a sufficient extent that they cannot be identified by another user. The blurring effect can be used to anonymize any person that may appear in the background and therefore alleviate any related security concerns.

In a contemplated embodiment for purposes of steps 814 and 816, facial recognition may determine where the user's face is in the video feed and as such the system would apply the oval filter effect to create an oval strictly around the user's face. The oval filter effect will move with and follow the user's face as it changes position in the image frames of the video feed, with the remainder of the video feed outside of the oval effect filter, wherever it happens to be, will be replaced or blurred. As such, the portions of the video feed that are replaced or blurred will change as the position of the face changes in the video feed. The oval filter may be configurable in size to better conform to the shape of a face of a particular user or users and therefore minimize any gaps between the oval effect filter and the user's face. The oval filter effect aims to encompass the user's face only with little to no gaps around the user's face that could provide a glimpse of the background behind the user's face.

Facial recognition algorithms in the processes 800 could both confirm the identify of an approved user and the location of the user's face, or could only be used only to determine the location of a detected face in the video feed. When facial recognition is used to identify the approved user and apply the filter effect around an identified face, the oval filter effect would securely defeat any attempt for a second person to appear on the call since the system would not recognize any other face than that of the approved user.

Figure 19:
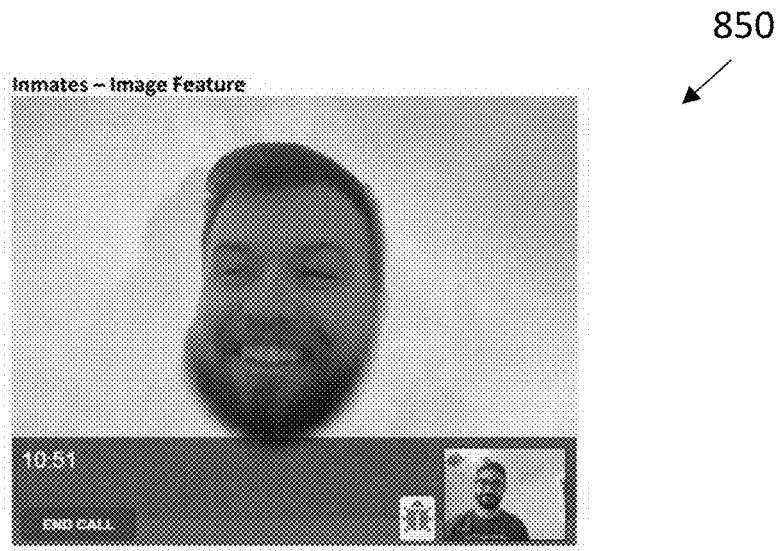
FIG. 19 illustrates an exemplary user interface graphical screen display including an oval effect filtering with background image replacement for the process illustrated in FIG. 18 and the system shown in FIG. 1-4.

FIG. 19 illustrates an exemplary user interface graphical screen display 850 including an oval effect filtering with background image replacement corresponding to steps 816 and 818. In contemplated examples, any jpg or png image that a facility desires could be used for the background image replacement. As such, only approved images by the correctional facility could be used for background replacement in contemplated embodiments, without an inmate or visitor user having ability to modify, change or replace the approved images. In alternative embodiments, however, a number of preapproved images could be provided with system users being able to choose which one of them they would prefer for use as the background image replacement. Still further, in some cases an inmate or visitor user could propose an image for approval by the correctional facility for use in video calls wherein background image replacement is needed. Considerably flexibility is possible in this regard for different correctional facilities to provide greater or lesser control of the use of images and/or to provide various different user experiences in the course of a video call.

Figure 20:
FIG. 20 illustrates an exemplary user interface graphical screen display including an oval effect filtering with background image blur for the process illustrated in FIG. 18 and the system shown in FIGS. 1-4.

FIG. 20 illustrates an exemplary user interface graphical screen display 860 including an oval effect filtering with background image blur corresponding to steps 816 and 820. The amount or degree of the blur may be adjusted to be more or less blurred at the option of a correctional facility administrator.

As another safeguard, and as shown at step 822 in FIG. 18, image depth criteria may be applied in the image processing to determine how close the detected face is to the camera. Such depth criteria can be used as a proxy to automatically reduce instances of "unsecure" content being transmitted and therefore provide a more secure video feed for use in a controlled environment.

The image processing in the system can be configured, for example, to determine whether a detected face is within maximum spatial distance from the camera of a user's device. The maximum spatial distance, sometimes referred to as a maximum range for purposes of the system 100, may be customizable by a facility or correctional facility administrator. As a non-limiting example, a maximum spatial range or range may be set to 3 ft. Such setting may be accepted and applied as a facility preference or set via a representative of the AV services system 120.

Following the example above, if a face is detected that is inside of the three foot range, the video feed is transmitted without alteration and the background of the video feed is included and unaffected so that other users on the video call may see the entire video feed. If a face is detected outside of the three foot range, however, the entire screen may be blurred as shown at step 824. This can happen if the approved user moves more than three feet away from the camera of the user device, or if the device is moved more than three feet away from the user's face, as well as when a face of person other than the approved user appears in the video feed outside of the three foot range. In all cases, the entire screen will blur from the perspective of others on the call as a security measure which actively prevents third party participation in a video call and/or protects third parties innocently appearing in the background of the video feed from being seen or identified by other users on the video call. Illegal activity that cannot be facilitated in the three foot range is likewise frustrated, and any concern for third parties to be inadvertently captured in a video feed is mitigated because the blurring will present such third parties from being seen by others on the call.

Steps 822 and 824 therefore operate in tandem to preclude a second unapproved person (e.g., a second visitor or a second inmate) from joining a video call in the background while an approved user occupies the foreground in the camera's field of view. Steps 822 and 824 likewise operate in tandem to preclude a face of an innocent bystander, a correctional facility worker, or a minor child from being broadcast in the background of an otherwise approved user participating in the call. In each case, the entire screen will be blurred until the second detected face which is outside the maximum spatial distance or range is no longer detected in the video feed. With optimal selection of the depth criteria, it may be practically impossible for a second person to join the call, or for any third party person's face being transmitted in the video feed to another person on a call made through the system. When only one face is detected in the three foot range, however, the background in the video feed may be seen and observed by others on the call.

The depth criteria and blur at steps 822 and 824 may likewise serve to prevent a transmission of nudity in a video feed generated by one of the user devices, provided that such nudity is accompanied by a detectable face in the image processing being performed. It would accordingly substantially reduce instances of nudity from being transmitted through the system, but not entirely eliminate it. On the inmate side, however, in the controlled environment where inmate access to a mobile inmate computer device is restricted to locations where other inmates are not showering, dressing or undressing the depth criteria may operate satisfactorily from a security perspective when employed on inmate computer devices.

The depth criteria applied at step 822 may be implemented using known video imaging techniques such as virtual boundaries and machine vision techniques to determine whether a detected face is inside or outside of the specified range from the camera. As algorithms and detection techniques are known and familiar to those well versed in machine vision to implement the features of step 822, such algorithms and techniques are within the purview of those in the art and are not further described herein. As an alternative to step 824, image replacement may be used in lieu of blurring the entire screen while realizing a similar effect to block the entire video transmission until the depth criteria is again satisfied. In still another embodiment, the screen could simply go dark, without being blurred or replaced with an image when the depth criteria is temporarily not satisfied. Numerous adaptations are possible in this regard to preclude "unsecure" content from being broadcasted in the video call.

Such depth criteria and blurring at steps 822 and 824 may be employed apart from or in addition to the oval filter effect and background image replacement or blur at steps 816, 818 or 820. That is, the system can flexibly run with one of them operating, the other of them operating, or both of them operating for multiplied security effect on inmate and visitor devices connected through the system. Likewise, the depth criteria and blurring at steps 822 and 824 and the oval filter effect and background image replacement or blur at steps 816, 818 or 820 may be run simultaneously but on different user devices such that different users are subjected to different types of security image processing (including no security image processing) in the course of the same video call to flexibly meet particular needs.

The video security image processing features and results described above are preferably included in stored recordings of calls so that correctional facility administrators may see and know that they are working to overcome otherwise potentially serious security concerns. That is, the recordings of calls will include any image filtering, partial or entire screen blurring, or partial or entire screen image replacement that certain users would have seen during the progress of the recorded call. Likewise, in any monitoring of a live call where one or more of the video security image processing features are running, the results (e.g., filtering, blur and image replacement) should be seen by correctional facility administrators so that may see and know that they are working.

Figure 21:
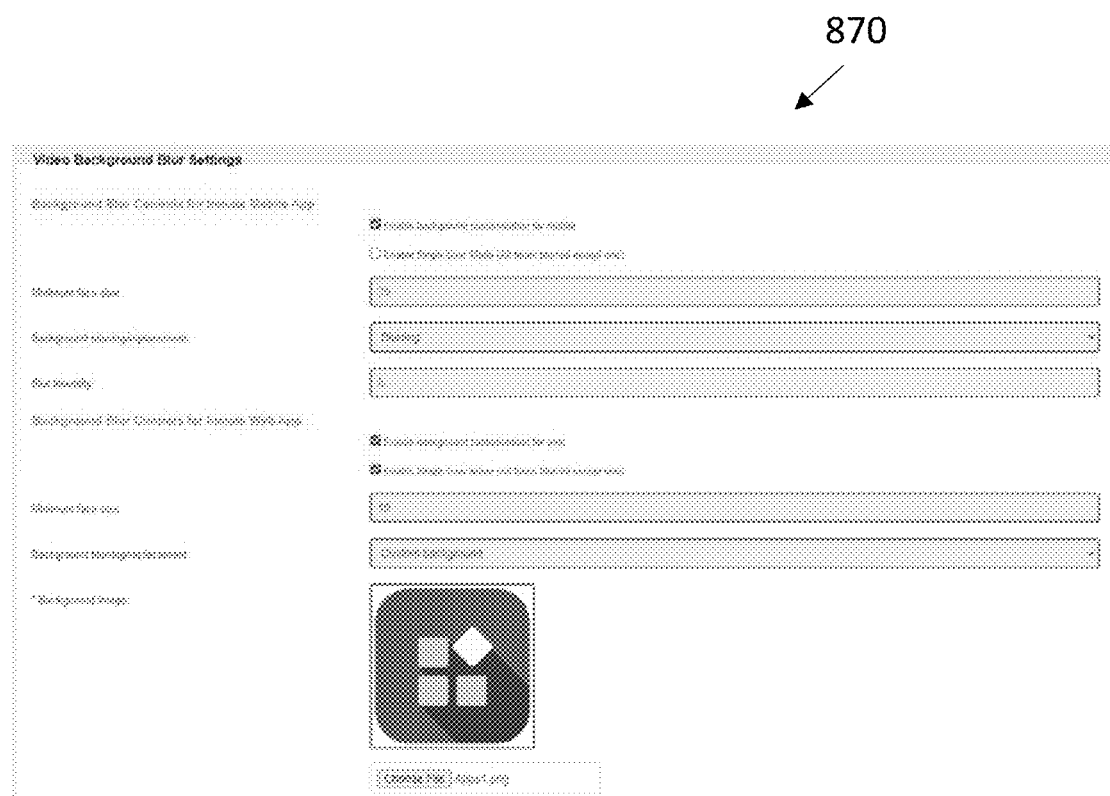
FIG. 21 illustrates an exemplary administrator interface enhanced video options for the process illustrated in FIG. 18 and the system shown in FIGS. 1, 2 and 4.

FIG. 21 illustrates an exemplary screen display 870 including enhanced video options and settings. In a contemplated embodiment, the screen display 870 may be accessed by an operator of the AV services system 120 or by a correctional facility administrator. The options and settings include enablement or disablement options for security image processing, adjustment options for the size of a detected face and the size of the oval filter, blurring and background image replacement options, blurring intensity adjustment, etc. Such options and settings may be accessed for application on the system via one or both of the user interface app 228 (FIG. 2) of a mobile user device and the web interface application on the AV services system 120 (also shown in FIG. 2).

Figure 22:
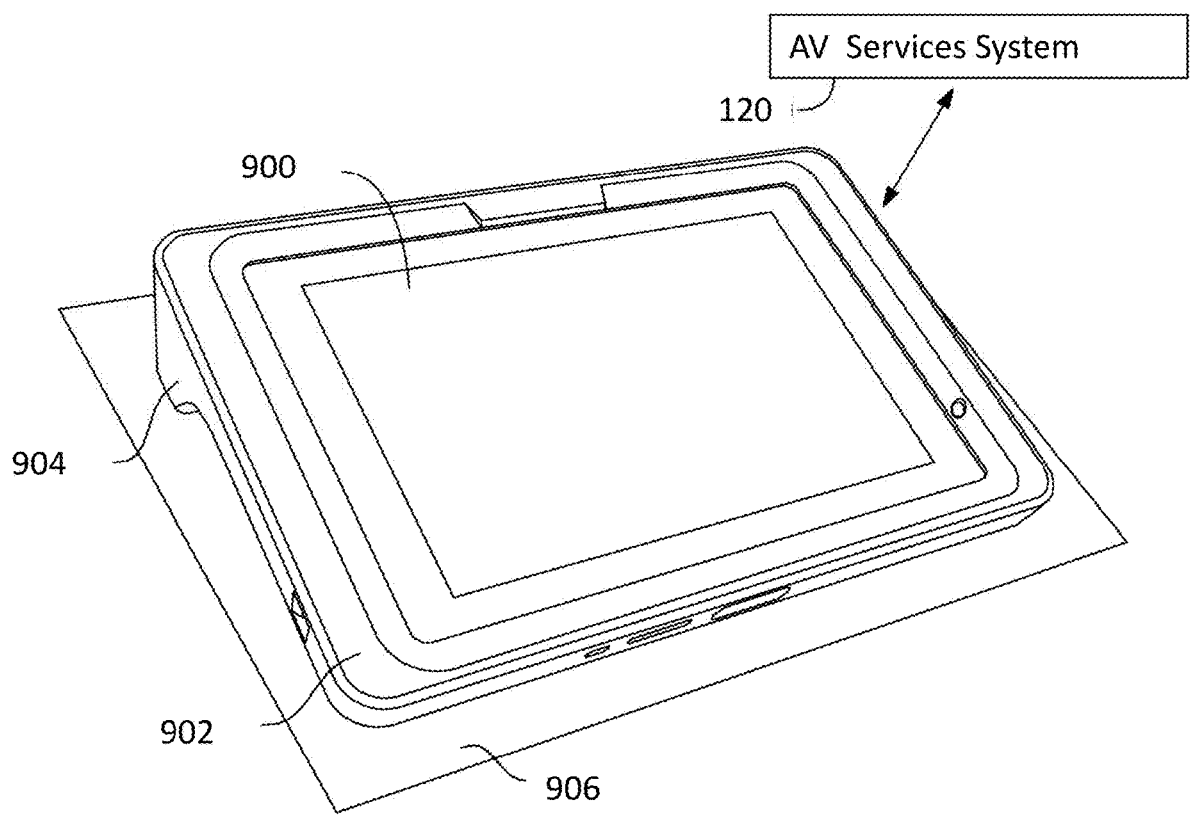
FIG. 22 is a perspective view of an exemplary tablet computer device that may be beneficially utilized as a mobile computer device in the exemplary systems and methods including the screen displays shown in FIGS. 1-21.

FIG. 22 is a perspective view of an exemplary tablet computer device 900 that may be beneficially utilized as a mobile computer device in an exemplary embodiment of a secure system of the present invention. In contemplated embodiments, the tablet computer device 900 may be a battery powered, processor-based device such an Android device or an IOS device including an 8 inch touchscreen. In contemplated examples, the tablet computer device 900 may include a 3200 mAh or greater battery offering extended use and long life, front and rear cameras having a desired resolution (e.g., 5 MP), and a speaker/microphone. The tablet computer device 900 may also include an optional case 902 with integral stand 904 on one side of the case 902. The stand 904 elevates the far side of the tablet computer device 900 relative to a tabletop or desktop surface 906 as shown in FIG. 22, while the near side of the case is not elevated. By virtue of the stand 904, the touch screen of the tablet computer device 900 is oriented at an angle relative to a tabletop or desktop surface 906, and is therefore oriented at a better viewing angle for optimal use of the tablet computer device 900 by an inmate. Of course, the tablet computer device 100 is lightweight and mobile such that the inmate (or another using having a similar device) may hold it by hand in any desired position and walk about with the device 100 in hand.

The case 902 provides a degree of protection for the device 900 as well as device security by making it more difficult for an inmate to try to tamper with or disassemble the tablet computer device 900. The case 902 may also be beneficially designed for compatibility with the device kiosk 190 (FIG. 1), and specifically may include relocated dock connectors and the like to facilitate electrical power and data connection between the tablet device 900 and the device kiosk 190 in an optimal way and mechanical features to secure the tablet computer device in a locked relation to the device kiosk 190 having corresponding locking elements and features.

The tablet computer device 900 may optionally also include an audio port such as a headphone jack, and a conventional charging port such as a micro-USB port, a lightning port, or a pin dock connector of conventional portable electronic devices. Asset tag location features, RFID features, and Wi-Fi or cellular connection features may also be provided, although in contemplated embodiments the tablet computer device 900 is configured to communicate exclusively with the AV services system 120. The tablet computer device 900 in contemplated embodiments further includes a central processing unit including one or more processors, 16 GB of memory, 2 GB DDR+ memory, an accelerometer, and a light Sensor.

The tablet computer device 900 may in some embodiments be constructed from heavy duty materials such as steel and includes structural assembly techniques to define a so-called "jail-hardened" device that meets specific requirements of correctional facility installation to meet security needs. Such a jail-hardened device would be appropriate for use as in inmate device in the correctional facility setting, although jail-hardened features would be optional for use as a visitor device or an administrator device.

While an exemplary embodiment of a tablet computer device 900 is shown and described, variations are possible with different sizes and form factors, different communication ports, different degree of memory storage, different processors, etc. The inventive concepts described herein are generally extendable to the entire market of tablet computer devices at various price points with varying performance capabilities and features.

In use, the tablet computer device 900 may wirelessly communicate with the AV visitation services system 120 and may accordingly be utilized by an inmate of a correctional facility to interact with approved visitors in any of the ways described above. The inmate user may log-in into the tablet computer device 900 to connect with the AV services system 120, and the tablet computer device 900 may run an inmate user interface with predetermined selection menus and options for the inmate to access different services that are pre-approved for use in the controlled environment of the correctional facility. As such, web content and access to external devices and systems may be tightly controlled, and inmates are generally precluded from using the tablet computer devices 900 apart from the preapproved services.

Devices similar to the tablet device 900 may be used as administrator and visitor devices in the systems and methods described above but respectively running correctional facility administrator user interfaces and visitor user interfaces. The administrator and user devices need not be provided in protective cases or have tamper proof features.

The above-described embodiments of the disclosure may be implemented using computer programming or engineering techniques including computer software, firmware, hardware or any combination or subset thereof, wherein the technical effects described above are achieved. Any such resulting program, having computer-readable code means, may be embodied or provided within one or more computer-readable media, thereby making a computer program product, (i.e., an article of manufacture), according to the embodiments described above. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

Such computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

The applications described above are flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described. Each component and process can also be used in combination with other assembly packages and processes.

One or more computer-readable storage media may include computer-executable instructions embodied thereon for interfacing with the various computer devices described and for interfacing the computer devices described with one another. The administrator user devices, inmate user devices, visitor computer devices, and AV services system may each include a memory device and a processor in communication with the memory device, and when executed by the processor in each respective device the computer-executable instructions may cause the processor to perform one or more algorithmic steps of a method such as the methods described and illustrated in the examples of FIGS. 5, 6, 14, 16, 17 and 18.

Having described devices and applicable operating algorithms functionally per the description above, those in the art may accordingly implement the algorithms via programming of the respective processor-based computing devices. Such programming or implementation of the concepts described is believed to be within the purview of those in the art and will not be described further.

The benefits of the inventive systems and methods are now believed to have been amply demonstrated in relation to the exemplary embodiments disclosed.

An embodiment of a computer-implemented system for securely managing electronic audio/video exchanges between a population of incarcerated inmates in a correctional facility and non-incarcerated visitors has been disclosed. The system includes a plurality of inmate computer devices, a plurality of visitor computer devices, an audio/visitor services computer device in communication with each of the plurality of inmate computer devices and each of the plurality of visitor computer devices, and at least one database including correctional facility data and information, incarcerated inmate data and information, and pre-approved visitor data and information linked to each respective one of the incarcerated inmates in the population. The audio visitor services computer system is configured to, based on the data and information in the at least one database, operate in a group service mode offering at least one group service supporting spontaneous group electronic audio/video exchange via selected ones of the plurality of inmate computer devices and selected ones of the plurality of visitor computer devices. Each spontaneous group electronic audio/video exchange includes a single uniquely identified one of the incarcerated inmates and a plurality of pre-approved visitors for the single uniquely identified one of the incarcerated inmates. Each spontaneous group electronic audio/video exchange involves less than a predetermined maximum number of pre-approved visitors set by the correctional facility. The at least one group service may be selectively enabled or disabled to permit or allow access to the at least one group service on the plurality of inmate computer devices in the correctional facility.

Optionally, the at least one group service is a group video call service. The audio/video services system may be configured so that each of the plurality of pre-approved visitors may participate in a group video call for a maximum amount of time equal to the lesser of a predetermined maximum time limit for the group video call set by the correctional facility or an individual visitor time limit based on an amount of financial funds available to apply to service charges for the group video call by each respective one of the plurality of pre-approved visitors. During the group video call a maximum amount of time may be displayed to each corresponding ones of the plurality of pre-approved visitors via the respective selected ones of the plurality of visitor devices. Only the single uniquely identified one of the incarcerated inmates may be presented with an option to start or terminate the group video call via a screen display on the respective one of the inmate computer devices accessed by the single uniquely identified one of the incarcerated inmates.

Also optionally, the plurality of pre-approved visitors for the group video call may be selected by the inmate via the respective one of the inmate computer devices accessed by the single uniquely identified one of the incarcerated inmates. A status of each of the pre-approved visitors as available or unavailable is indicated to the inmate when selecting the plurality of pre-approved visitors via the respective one of the inmate computer devices accessed by the single uniquely identified one of the incarcerated inmates.

The system may further include an administrator computer device in communication with the audio/video services system. The administrator device may be configured to include an option to schedule a group video call, and the group video call may relate to a legal proceeding involving the single uniquely identified one of the incarcerated inmates. The administration computer device may be configured to provide live monitoring of the group video call by a correctional facility administrator. The administrator computer device may be configured to present an option to the correctional facility administrator to suspend participation by any individual ones of the pre-approved visitors on the group video call. The administrator computer device may be configured to present an option to the correctional facility administrator to terminate the group video call.

The system may optionally be configured to automatically process images of a video feed from a video camera of one or more of an inmate computer device and the plurality of visitor computer devices to prevent a video transmission of unsecure video content during a group video call. The unsecure video content may correspond to nudity in the images of the video feed, to an unauthorized participant in images of the video feed, to inappropriate background content in the images of the video feed, or to an innocent third party in the images of the video feed. The system may be configured to automatically process images in the video feed by applying a filter effect around a user's face in the images of the video feed. The image processing may also include a background image blur or replacement.

The system may be configured to automatically process images of the video feed by detecting a human face in a video feed. The image processing may also include determining whether a detected face is within a predetermined proximity range from the video camera. If the detected face is not within the predetermined proximity range the entire video feed may be altered, and the entire video feed may be blurred.

One or more of the inmate computer device and the plurality of visitor computer devices may be a mobile computer device. The mobile computer device may be a tablet computer device. The at least one group service may be a group voice call service or a group messaging service. The group message service may be configured to start a group message thread for posted messages, the posted messages selected from the group of recorded video messages, record voice messages, text messages, and message attachments. The message attachments may include images and emojis. A proposed message may be approved before being posted to the group message thread. Each visitor posting a message to the group message thread may be assessed a service charge.

The system of claim may also include an administrator computer device, the administrator device including an option to monitor the group message thread by a correctional facility administrator. The administrator computer device may be configured to present an option to the correctional facility administrator to suspend posting of messages by any of the pre-approved visitors. The administrator computer device may be configured to present an option to the correctional facility administrator to terminate the group message thread. The audio/video services system may be a server-based hosted services system.

The at least one database may include inmate privilege data and information, and wherein the system is configured to apply an inmate privilege status to the single uniquely identified one of the incarcerated inmates prior to the spontaneous group electronic audio/video exchange. The system may be configured to automatically process images of a video feed from one or more of the selected ones of the plurality of inmate computer devices and selected ones of the plurality of visitor computer devices in the spontaneous group electronic audio/video exchange.

The system may be selectively operable to automatically process images of at least one video feed in order to prevent a video transmission of unsecure video content during the spontaneous group electronic audio/video exchange in one of a plurality of different security modes. The plurality of different security modes may include basic image processing, intermediate image processing and advanced image processing. The basic image processing transmits any person in the image feed while blurring a background of the video feed. The intermediate image processing transmits only one person in the image feed while blurring a background of the video feed, and blurs the entire video feed when more than one person is present in the video feed. The advanced image processing transmits only the face of a detected person in the video call, and the transmission of only the face depends on the proximity of the face to a camera generating the video feed. When only the face is outside of a predetermined proximity range from the camera, the entire video feed is blurred.

Each of the basic image processing, intermediate image processing and advanced image processing may operate to blur at least a portion of the video feed, wherein an intensity setting of the blur is adjustable via a screen display. The at least one group service includes a plurality of different group services, and wherein the basic image processing, intermediate image processing and advanced image processing are selectively operable with respect each of the plurality of different group services according to correctional facility preferences.

The system may also be configured to offer a singular audio/video service supporting a spontaneous interaction between a single inmate and a single visitor. In the singular audio/video service, the system is automatically operable to process images of at least one video feed in order to prevent a video transmission of unsecure video content in one of a plurality of different security modes including a basic security mode, an intermediate security mode, and an advanced security mode. The basic security mode of the system filters a background of the video feed. The intermediate security mode prevents a transmission of a second party in the video feed. The advanced security mode is operative with respect to only a detected face in the video feed.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented system for securely managing electronic audio/video exchanges between a population of incarcerated inmates in a correctional facility and non-incarcerated visitors, the system comprising:
   a plurality of inmate computer devices;
   a plurality of visitor computer devices;
   an audio/video services computer system in communication with each of the plurality of inmate computer devices and each of the plurality of visitor computer devices; and
   at least one database including correctional facility data and information, authorized incarcerated inmate data and information, and pre-approved authorized non-incarcerated visitor data and information linked to each respective one of the authorized incarcerated inmates in the population of incarcerated inmates in the correctional facility;

wherein the audio/video services computer system is configured to operate in (i) an authorized singular service mode supporting a singular spontaneous electronic audio/video exchange via respective ones of inmate computer devices and visitor computer devices between a single uniquely identified one of the incarcerated inmates and a single pre-approved authorized non-incarcerated visitor invited by the audio/video computer system and who is linked to the single uniquely identified one of the authorized incarcerated inmates according to the authorized incarcerated inmate data and information and the pre-approved authorized non-incarcerated visitor data and information; and (ii) an authorized group service mode offering at least one group service supporting spontaneous group electronic audio/video exchange via selected ones of the plurality of inmate computer devices and selected ones of the plurality of visitor computer devices;

wherein each spontaneous group electronic audio/video exchange includes a single uniquely identified one of the authorized incarcerated inmates and a plurality of pre-approved authorized non-incarcerated visitors invited by the system and who are linked to the single uniquely identified one of the authorized incarcerated inmates according to the authorized incarcerated inmate data and information and the pre-approved authorized non-incarcerated visitor data and information;

wherein each spontaneous group electronic audio/video exchange does not exceed a predetermined maximum number of linked pre-approved authorized non-incarcerated visitors selected by the correctional facility; and wherein the system is configured so that the authorized group service mode is selectively enabled or disabled by an administrator user to permit or allow access to the authorized group service mode on at least some of the plurality of inmate computer devices in the correctional facility.

2. The system of claim 1, wherein in the authorized group service mode the system is configured so that each of the plurality of pre-approved authorized non-incarcerated visitors may participate in in the spontaneous group electronic audio/video exchange for a maximum amount of time equal to the lesser of a predetermined maximum time limit for the spontaneous group electronic audio/video exchange set by the correctional facility or an individual visitor time limit based on an amount of financial funds available to apply to service charges for the spontaneous group electronic audio/video exchange by each respective one of the plurality of pre-approved authorized non-incarcerated visitors.

3. The system of claim 2, wherein during the spontaneous group electronic audio/video exchange a maximum amount of time is displayed to each corresponding one of the plurality of pre-approved authorized non-incarcerated visitors via the respective selected ones of the plurality of visitor devices.

4. The system of claim 1, wherein only a single uniquely identified one of the authorized incarcerated inmates is presented with an option to start or terminate the spontaneous group electronic audio/video exchange via a screen display on the respective one of the inmate computer devices accessed by the single uniquely identified one of the authorized incarcerated inmates.

5. The system of claim 1, wherein the plurality of pre-approved visitors for the spontaneous group electronic audio/video exchange are selected by a single uniquely identified one of the authorized incarcerated inmates via the respective one of the inmate computer devices accessed by the single uniquely identified one of the authorized incarcerated inmates.

6. The system of claim 5, wherein a status of each of the pre-approved authorized non-incarcerated visitors as available or unavailable for the spontaneous group electronic audio/video exchange is indicated to the single uniquely identified one of the authorized incarcerated inmates when selecting the plurality of pre-approved authorized non-incarcerated visitors via the respective one of the inmate computer devices accessed by the single uniquely identified one of the authorized incarcerated inmates.

7. The system of claim 1, further comprising an administrator computer device in communication with the audio/video services computer system.

8. The system of claim 7, wherein the administrator device is configured to include an option to schedule a group electronic audio/video exchange relating to a legal proceeding involving a single uniquely identified one of the incarcerated inmates.

9. The system of claim 7, wherein the administration computer device is configured to provide live monitoring of the group spontaneous group electronic audio/video exchange by a correctional facility administrator.

10. The system of claim 9, wherein the administrator computer device is configured to present an option to the correctional facility administrator to suspend participation by any individual ones of the pre-approved authorized non-incarcerated visitors on the spontaneous group electronic audio/video exchange.

11. The system of claim 9, wherein the administrator computer device is configured to present an option to the correctional facility administrator to terminate the spontaneous group electronic audio/video exchange.

12. The system of claim 1, wherein the system is configured to automatically process images of a video feed from a video camera of one or more of an inmate computer device and the plurality of visitor computer devices to prevent a video transmission of unsecure video content during a group video call.

13. The system of claim 12, wherein the unsecure video content corresponds to nudity in the images of the video feed.

14. The system of claim 12, wherein the unsecure video content corresponds to an unauthorized participant in images of the video feed.

15. The system of claim 12, wherein the unsecure video content corresponds to inappropriate background content in the images of the video feed.

16. The system of claim 12, wherein the unsecure video content corresponds to an innocent third party in the images of the video feed.

17. The system of claim 12, wherein the system is configured to automatically process images in the video feed by applying a filter effect around a user's face in the images of the video feed.

18. The system of claim 17, wherein the image processing further includes a background image blur or replacement.

19. The system of claim 12, wherein the system is configured to automatically process images of the video feed by detecting a human face in a video feed.

20. The system of claim 19, wherein the image processing further includes determining whether a detected face is within a predetermined proximity range from the video camera.

21. The system of claim 20, wherein if the detected face is not within the predetermined proximity range the entire video feed is altered.

22. The system of claim 21, wherein the entire video feed is blurred.

23. The system of claim 12, wherein one or more of the inmate computer device and the plurality of visitor computer devices is a mobile computer device.

24. The system of claim 23, wherein the mobile computer device is a tablet computer device.

25. The system of claim 1, wherein the audio/visitor services computer system is further configured to provide a group messaging service between linked uniquely identified ones of the authorized incarcerated inmates and pre-approved authorized non-incarcerated visitors according to the authorized incarcerated inmate data and information and the pre-approved authorized non-incarcerated visitor data and information.

26. The system of claim 25, wherein the group message service is configured to start a group message thread for posted messages, the posted messages selected from the group of recorded video messages, recorded voice messages, text messages, and message attachments.

27. The system of claim 26, wherein the message attachments include images and emojis.

28. The system of claim 27, wherein a proposed message is approved by an administrator before being posted to the group message thread.

29. The system of claim 26, wherein each pre-approved authorized non-incarcerated visitor posting a message to the group message thread is assessed a service charge.

30. The system of claim 26, further comprising an administrator computer device, the administrator device including an option to monitor the group message thread by a correctional facility administrator.

31. The system of claim 30, wherein the administrator computer device is configured to present an option to the correctional facility administrator to suspend posting of messages by any of the pre-approved visitors.

32. The system of claim 27, wherein the administrator computer device is configured to present an option to the correctional facility administrator to terminate the group message thread.

33. The system of claim 32, wherein the audio/video services computer system is a server-based hosted services system.

34. The system of claim 1, wherein the at least one database includes inmate privilege data and information, and wherein the system is configured to apply an inmate privilege status to the single uniquely identified one of the authorized incarcerated inmates prior to the spontaneous group electronic audio/video exchange.

35. The system of claim 1, wherein the system is further configured to automatically process images of a video feed from one or more of the selected ones of the plurality of inmate computer devices and selected ones of the plurality of visitor computer devices in the spontaneous group electronic audio/video exchange.

36. The system of claim 35, wherein the system is selectively operable to automatically process images of at least one video feed in order to prevent a video transmission of unsecure video content during the spontaneous group electronic audio/video exchange in one of a plurality of different security modes.

37. The system of claim 36, wherein the plurality of different security modes includes basic image processing, intermediate image processing and advanced image processing.

38. The system of claim 37, wherein the basic image processing transmits any person in the image feed while blurring a background of the video feed.

39. The system of claim 37, wherein the intermediate image processing transmits only one person in the image feed while blurring a background of the video feed.

40. The system of claim 39, wherein the intermediate image processing blurs the entire video feed when more than one person is present in the video feed.

41. The system of claim 37, wherein the advanced image processing transmits only the face of a detected person in the video call.

42. The system of claim 41, wherein the transmission of only the face depends on the proximity of the face to a camera generating the video feed.

43. The system of claim 42, wherein when only the face is outside of a predetermined proximity range from the camera, the entire video feed is blurred.

44. The system of claim 37, wherein each of the basic image processing, intermediate image processing and advanced image processing operate to blur at least a portion of the video feed, wherein an intensity setting of the blur is adjustable via a screen display.

45. The system of claim 37, wherein the at least one group service includes a plurality of different group services, and wherein the basic image processing, intermediate image processing and advanced image processing are selectively operable with respect each of the plurality of different group services according to correctional facility preferences.

46. The system of claim 1, wherein in the authorized singular service mode, the system is automatically operable to process images of at least one video feed in order to prevent a video transmission of unsecure video content in one of a plurality of different security modes including a basic security mode, an intermediate security mode, and an advanced security mode.

47. The system of claim 46, wherein the basic security mode the system filters a background of the video feed.

48. The system of claim 47, wherein the intermediate security mode prevents a transmission of a second party in the video feed.

49. The system of claim 48, wherein the advanced security mode is operative with respect to only a detected face in the video feed.

50. The system of claim 1, wherein the audio/video services computer system is further configured so that each pre-approved authorized non-incarcerated visitor may communicate only with linked uniquely identified authorized incarcerated inmates.

51. The system of claim 1, wherein the audio video audio/video services computer system is further configured so that each uniquely identified authorized incarcerated inmate may only communicate with linked pre-approved authorized non-incarcerated visitors.

* * * * *